United States Patent
Sugio et al.

(10) Patent No.: US 10,911,771 B2
(45) Date of Patent: *Feb. 2, 2021

(54) MOVING PICTURE CODING METHOD, MOVING PICTURE CODING APPARATUS, MOVING PICTURE DECODING METHOD, MOVING PICTURE DECODING APPARATUS, AND MOVING PICTURE CODING AND DECODING APPARATUS

(71) Applicant: Sun Patent Trust, New York, NY (US)

(72) Inventors: Toshiyasu Sugio, Osaka (JP); Takahiro Nishi, Nara (JP); Youji Shibahara, Tokyo (JP); Hisao Sasai, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,756

(22) Filed: Dec. 23, 2019

(65) Prior Publication Data
US 2020/0128269 A1 Apr. 23, 2020

Related U.S. Application Data

(63) Continuation of application No. 16/211,721, filed on Dec. 6, 2018, now Pat. No. 10,623,764, which is a
(Continued)

(51) Int. Cl.
*H04N 19/52* (2014.01)
*H04N 19/51* (2014.01)
(Continued)

(52) U.S. Cl.
CPC ......... *H04N 19/513* (2014.11); *H04N 19/159* (2014.11); *H04N 19/176* (2014.11);
(Continued)

(58) Field of Classification Search
CPC .................................................. H04N 19/513
See application file for complete search history.

(56) References Cited

U.S. PATENT DOCUMENTS

| | | | | |
|---|---|---|---|---|
| 6,020,933 A | * | 2/2000 | Lee | H04N 19/51 348/699 |
| 8,005,144 B2 | * | 8/2011 | Ji | H04N 19/513 375/240.16 |

(Continued)

FOREIGN PATENT DOCUMENTS

| | | |
|---|---|---|
| EP | 1 863 289 A2 | 12/2007 |
| EP | 2 343 902 | 7/2011 |

(Continued)

OTHER PUBLICATIONS

Office Action dated May 2, 2014 in U.S. Appl. No. 13/889,843.
(Continued)

*Primary Examiner* — Irfan Habib
(74) *Attorney, Agent, or Firm* — Wenderoth, Lind & Ponack, L.L.P.

(57) ABSTRACT

A moving picture coding method includes: coding a coding target block using a motion vector; generating motion vector predictors; and coding the motion vector using one of the motion vector predictors generated in the generating of the motion vector predictors. In the generating of the motion vector predictors, a replacement vector which replaces a temporal motion vector predictor is added to the motion vector predictors when it is impossible to obtain the temporal motion vector predictor from a block which is included in a coded picture different from the coding target picture and corresponds to the coding target block.

2 Claims, 42 Drawing Sheets

| Motion vector predictor index | Motion vector predictor candidate |
|---|---|
| 0 | Median (MV_A, MV_B, MV_C) |
| 1 | MV_A |
| 2 | MV_B |
| 3 | MV_C |
| 4 | Temporal motion vector predictor |

Related U.S. Application Data continuation of application No. 15/730,867, filed on Oct. 12, 2017, now Pat. No. 10,194,164, which is a continuation of application No. 15/606,103, filed on May 26, 2017, now Pat. No. 9,819,960, which is a continuation of application No. 15/447,329, filed on Mar. 2, 2017, now Pat. No. 9,693,073, which is a continuation of application No. 15/218,301, filed on Jul. 25, 2016, now Pat. No. 9,641,859, which is a continuation of application No. 14/926,366, filed on Oct. 29, 2015, now Pat. No. 9,432,691, which is a continuation of application No. 13/912,468, filed on Jun. 7, 2013, now Pat. No. 9,204,146, which is a continuation of application No. 13/889,843, filed on May 8, 2013, now Pat. No. 8,948,261, which is a continuation of application No. PCT/JP2012/000868, filed on Feb. 9, 2012.

(60) Provisional application No. 61/441,304, filed on Feb. 10, 2011.

(51) Int. Cl.
*H04N 19/577* (2014.01)
*H04N 19/513* (2014.01)
*H04N 19/597* (2014.01)
*H04N 19/527* (2014.01)
*H04N 19/176* (2014.01)
*H04N 19/44* (2014.01)
*H04N 19/159* (2014.01)
*H04N 19/503* (2014.01)
*H04N 19/177* (2014.01)

(52) U.S. Cl.
CPC ........... *H04N 19/44* (2014.11); *H04N 19/503* (2014.11); *H04N 19/51* (2014.11); *H04N 19/52* (2014.11); *H04N 19/521* (2014.11); *H04N 19/527* (2014.11); *H04N 19/577* (2014.11); *H04N 19/597* (2014.11); *H04N 19/177* (2014.11)

(56) References Cited

U.S. PATENT DOCUMENTS

| | | | | |
|---|---|---|---|---|
| 8,345,996 B2* | 1/2013 | Kudana | ............... | H04N 19/139 382/236 |
| 8,693,546 B2 | 4/2014 | Takahashi et al. | | |
| 8,711,936 B2* | 4/2014 | Ito | ............... | H04N 19/513 375/240.16 |
| 8,861,606 B2* | 10/2014 | Wahadaniah | ........ | H04N 19/513 375/240.16 |
| 8,913,665 B2* | 12/2014 | Wahadaniah | ........ | H04N 19/527 375/240.16 |
| 9,420,286 B2* | 8/2016 | Chen | ............... | H04N 19/58 |
| 9,426,464 B2* | 8/2016 | Francois | ............... | H04N 19/147 |
| 9,609,346 B2* | 3/2017 | Lin | ............... | H04N 19/583 |
| 2005/0141610 A1 | 6/2005 | Isu | | |
| 2006/0023788 A1* | 2/2006 | Otsuka | ............... | H04N 19/112 375/240.16 |
| 2007/0110160 A1* | 5/2007 | Wang | ............... | H04N 19/197 375/240.16 |
| 2008/0063075 A1* | 3/2008 | Kondo | ............... | H04N 19/58 375/240.16 |
| 2008/0159401 A1* | 7/2008 | Lee | ............... | H04N 19/159 375/240.16 |
| 2008/0175320 A1* | 7/2008 | Sun | ............... | H04N 19/105 375/240.12 |
| 2009/0232217 A1* | 9/2009 | Lee | ............... | H04N 19/109 375/240.16 |
| 2009/0304078 A1* | 12/2009 | Yuasa | ............... | H04N 19/44 375/240.12 |
| 2010/0118969 A1* | 5/2010 | Kondo | ............... | H04N 19/51 375/240.16 |
| 2011/0142133 A1 | 6/2011 | Takahashi et al. | | |
| 2011/0170602 A1* | 7/2011 | Lee | ............... | H04N 19/70 375/240.16 |
| 2011/0280311 A1* | 11/2011 | Chen | ............... | H04N 19/597 375/240.24 |
| 2011/0317930 A1 | 12/2011 | Kim et al. | | |
| 2012/0069902 A1* | 3/2012 | Yamori | ............... | H04N 19/44 375/240.12 |
| 2012/0075436 A1* | 3/2012 | Chen | ............... | H04N 13/161 348/51 |
| 2012/0147966 A1* | 6/2012 | Lee | ............... | H04N 19/105 375/240.16 |
| 2012/0155542 A1* | 6/2012 | Lee | ............... | H04N 19/70 375/240.16 |

FOREIGN PATENT DOCUMENTS

| | | |
|---|---|---|
| JP | 2008-211697 | 9/2008 |
| JP | 2009-543508 | 12/2009 |
| JP | 2010-081465 | 4/2010 |
| JP | 2010-268199 | 11/2010 |
| JP | 2011-160468 | 8/2011 |
| WO | 2007/074543 | 7/2007 |
| WO | 2008/007913 | 1/2008 |
| WO | 2010/035370 | 4/2010 |

OTHER PUBLICATIONS

International Search Report dated May 1, 2012 in corresponding International Application No. PCT/JP2012/000868.
Written Opinion of the International Searching Authority dated May 1, 2012 in corresponding International Application No. PCT/JP2012/000868.
"Advanced video coding for generic audiovisual services", ITU-T Recommendation H.264, Mar. 2010.
Thomas Wiegand et al., "WD1: Working Draft 1 of High-Efficiency Video Coding", Joint Collaborative Team on Video Coding (JCT-VC) of ITU-T SG16 WP3 and ISO/IEC JTC1/SC29/WG11, JCTVC-C403, Ver. 1, 3rd Meeting: Guangzhou, CN, Oct. 7-15, 2010.
Written Opinion dated Nov. 5, 2014 in corresponding Singaporean Application No. 2013059746.
Patent Examination Report No. 1 dated Nov. 18, 2015 in Australian Application No. 2012216026.
Partial Supplementary European Search Report dated May 3, 2016 in European Patent Application No. 12744978.3.
Toshiyasu Sugio et al., "Modified derivation process of temporal motion vector predictor", Joint Collaborative Team on Video Coding (JCT-VC) of ITU-T SG16 WP3 and ISO/IEC JTC1/SC29/WG11, 4th Meeting: Daegu, KR, Jan. 20-28, 2011, JCTVC-D273, WG11 No. m19038, XP30047606.
Extended European Search Report dated Sep. 21, 2016 in European Patent Application No. 12744978.3.
Jian-Liang Lin et al., "Improved Advanced Motion Vector Prediction", Joint Collaborative Team on Video Coding (JCT-VC) of ITU-T SG16 WP3 and ISO/IEC JTC1/SC29/WG11 JCTVC-D125, ITU-T, Jan. 28, 2011, p. 1-8.
Jian-Liang Lin et al., "Syntax for AMVP Parsing Error Control", Joint Collaborative Team on Video Coding (JCT-VC) of ITU-T SG16 WP3 and ISO/IEC JTC1/SC29/WG11 JCTVC-D126, ITU-T, Jan. 28, 2011, p. 1-3.
Bin Li et al., "Constrained temporal motion vector prediction for error resilience", Joint Collaborative Team on Video Coding (JCT-VC) of ITU-T SG16 WP3 and ISO/IEC JTC1/SC29/WG11 JCTVC-D139, ITU-T, Jan. 28, 2011, p. 1-4.

* cited by examiner

FIG. 4

| Motion vector predictor index | Assigned bitstream |
|---|---|
| 0 | 0 |
| 1 | 10 |
| 2 | 110 |
| 3 | 1110 |
| 4 | 1111 |

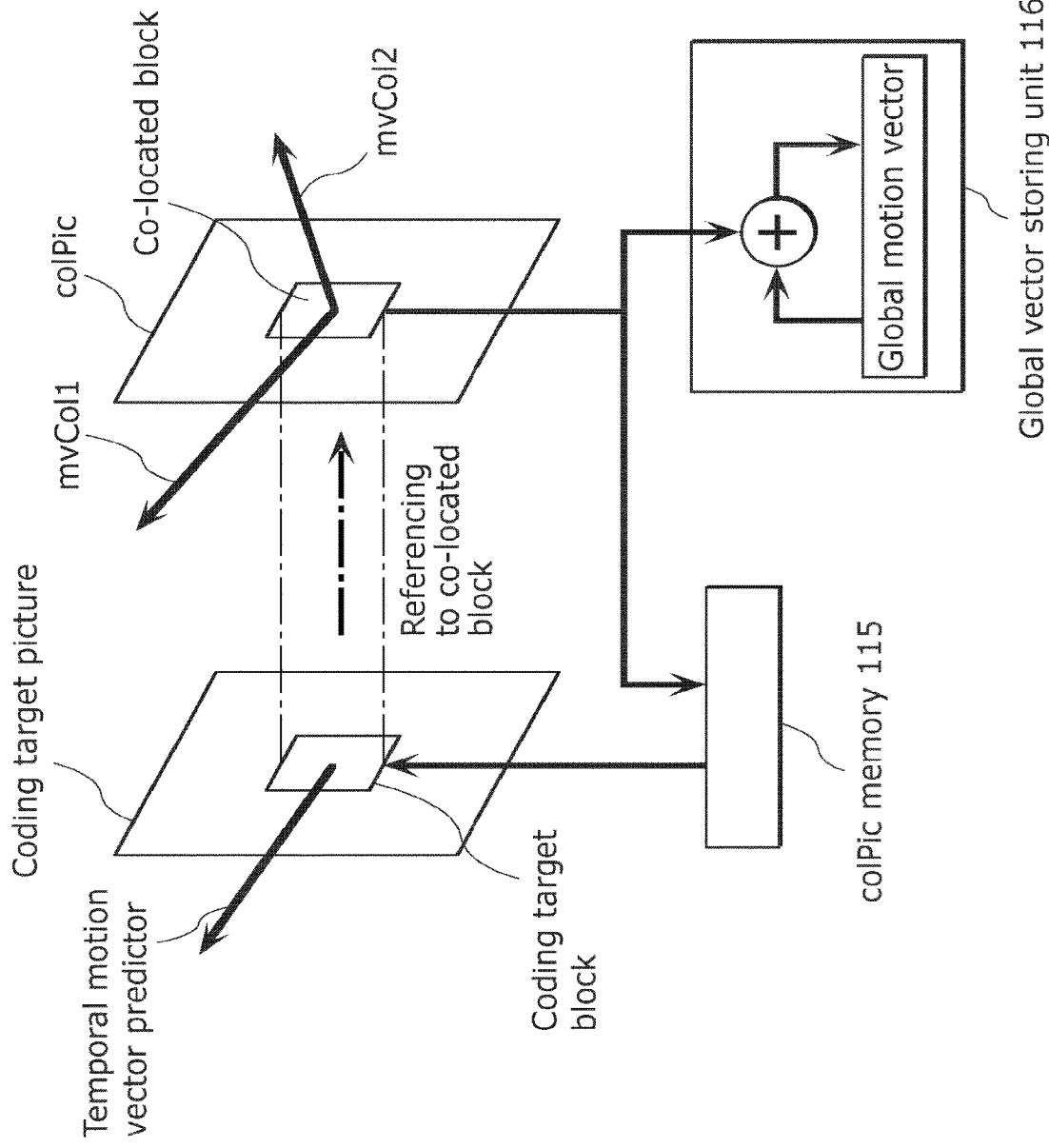

FIG. 14

```
Picture header
{
    ...
    forbid_collocated_flag;
    if(forbid_colPic_flag == 1)
    {
        tmv_x;
        tmv_y;
    }
    else
    {
        collocated_from_IO_flag;
    }
    ...
}
```

- Co-located block use prohibition flag → forbid_collocated_flag;
- Global motion vector predictor (horizontal) → tmv_x;
- Global motion vector predictor (vertical) → tmv_y;
- Co-located reference block direction flag → collocated_from_IO_flag;

FIG. 29
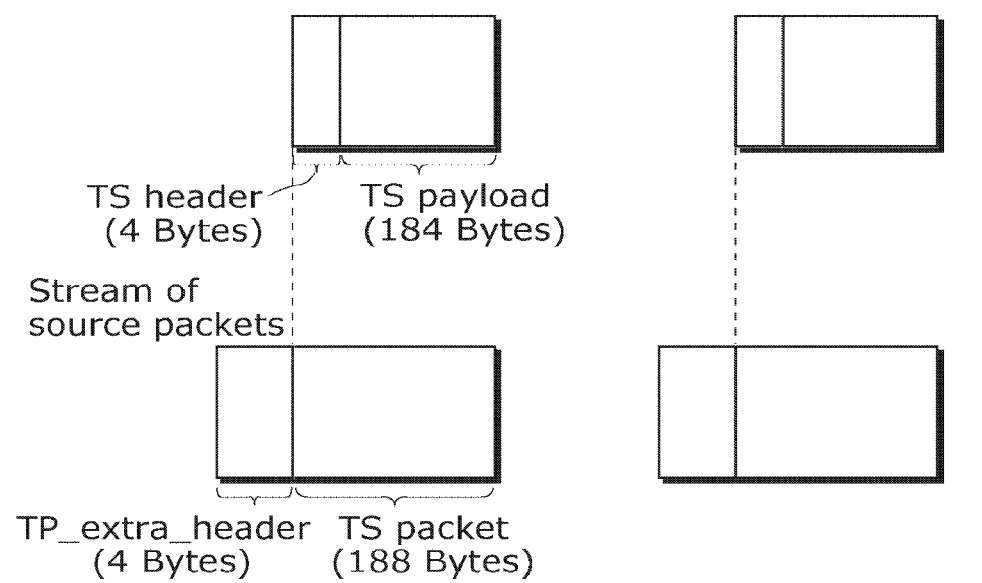
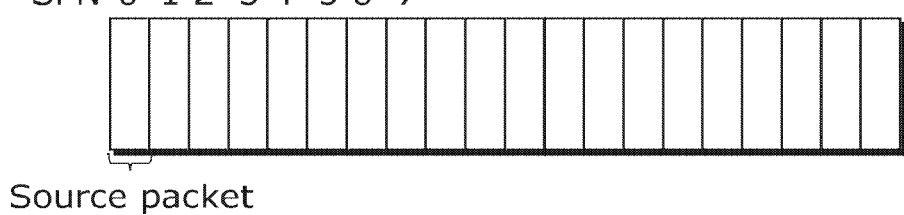

FIG. 37

| Corresponding standard | Driving frequency |
|---|---|
| MPEG-4 AVC | 500 MHz |
| MPEG-2 | 350 MHz |
| ⋮ | ⋮ | ex900 ex1000

MOVING PICTURE CODING METHOD, MOVING PICTURE CODING APPARATUS, MOVING PICTURE DECODING METHOD, MOVING PICTURE DECODING APPARATUS, AND MOVING PICTURE CODING AND DECODING APPARATUS

FIELD

One or more exemplary embodiments of the present disclosure relates to a moving picture coding method and a moving picture decoding method.

BACKGROUND

In a video coding process, the amount of information is generally compressed utilizing redundancy in a spatial direction or a temporal direction of a video. Here, transform into a frequency domain is generally used as a method utilizing redundancy in a spatial direction. On the other hand, inter picture prediction (hereinafter referred to as inter prediction) is used as a method utilizing redundancy in a temporal direction.

When coding a coding target picture in an inter prediction coding process, a coded picture located forward or backward of the coding target picture in display time order is used as a reference picture. A motion vector is derived from the reference picture by performing motion estimation for the coding target picture. Then, the redundancy in the temporal direction is removed by calculating the difference between the prediction image data obtained by performing motion compensation based on the motion vector and the image data of the coding target picture. Here, in the motion estimation, the value of difference between a coding target block in the coding target picture and each of the blocks in the reference picture is calculated, and the block having the minimum difference value in the reference picture is determined as a reference block. The motion vector is estimated using the coding target block and the reference block.

In the standardized video coding standard called H.264, three types of pictures called I-picture, P-picture, and B-picture are used to compress the amount of information. An I-picture is a picture for which no inter prediction coding process is performed, in other words, for which only intra picture prediction (hereinafter referred to as intra prediction) coding processes are performed. A P-picture is a picture for which inter prediction coding is performed with reference to only a coded picture located forward or backward of a coding target picture in display time order. A B-picture is a picture for which inter prediction coding is performed with reference to two coded pictures each located forward or backward of a coding target picture in display time order.

In addition, the video coding standard called H.264 supports motion vector estimation modes for coding the value of difference between prediction image data and a coding target block and a motion vector used to generate the prediction image data, as coding modes for performing inter prediction on each of coding target blocks in a B-picture. As the motion vector estimation modes, the following directions can be selected: a bidirectional prediction for generating a prediction image with reference to two coded pictures located forward or backward of a coding target picture; and a unidirectional prediction for generating a prediction image with reference to a coded picture located forward or backward of a coding target picture.

In addition, in the video coding standard called H.264, it is possible to select a coding mode called a temporal motion vector predictor mode when deriving a motion vector in coding of a B-picture. The inter prediction coding method in the temporal motion vector predictor mode is described with reference to FIG. 19. FIG. 19 is an illustration of motion vectors in the temporal motion vector predictor mode, and shows a case of coding a block a in a picture B2 using the temporal motion vector predictor mode.

In this case, a motion vector vb which is of a block b co-located with the block a and in the picture P3 is used. The picture P3 is a reference picture located backward of the picture B2. The motion vector vb is a motion vector used in the coding of the block b, and shows reference to a picture P1. The block a is coded by bidirectional prediction using a reference block obtained from the picture P1 which is a forward reference picture and a picture P3 which is a backward reference picture using a motion vector parallel to the motion vector vb. In other words, the motion vectors used in the coding of the block a is a motion vector vat in relation to the picture P1 and a motion vector vat in relation to the picture P3.

CITATION LIST

Non Patent Literature

[NPL 1]
ITU-T Recommendation H.264 "Advanced Video Coding for generic audiovisual services", March, 2010

SUMMARY

Technical Problem

However, in the conventional temporal motion vector predictor mode, when information of a reference picture having information such as a motion vector to be used to calculate a temporal motion vector predictor is lost, for example, due to a packet loss in streaming distribution, it is impossible to calculate a correct temporal motion vector predictor, resulting in a deteriorated decoded image. Furthermore, the error propagates to pictures which refer to the decoded image, which may result in stoppage of the decoding process. For example, when information of the reference picture P3 in FIG. 19 is lost, it is impossible to calculate a temporal motion vector predictor for the picture B2. This may makes it impossible to perform correct decoding of the picture B2, which may result in stoppage of the decoding process.

One non-limiting embodiment has been made in view of this to provide a moving picture coding method and a moving picture decoding method for effectively preventing error propagation in decoding processes.

Solution to Problem

In one general aspect, the techniques disclosed here feature a moving picture coding method for performing inter prediction coding on a coding target block included in a coding target picture, the moving picture coding method including: coding the coding target block using a motion vector; generating a plurality of motion vector predictors; and coding the motion vector using one of the plurality of motion vector predictors generated in the generating, wherein, in the generating, a replacement vector which replaces a temporal motion vector predictor is included in the plurality of motion vector predictors when it is impossible to obtain the temporal motion vector predictor from a block which is included in a coded picture different from the coding target picture and corresponds to the coding target block.

These general and specific aspects may be implemented using a system, an apparatus, an integrated circuit, a computer program, or a computer-readable recording medium such as a CD-ROM, or any combination of systems, apparatuses, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

According to one or more exemplary embodiments of the moving picture coding method, it is possible to prevent decoding error propagation while suppressing decrease in coding efficiency by selectively including a temporal motion vector predictor or a replacement vector in motion vector predictor candidates.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 shows an example of a code table for use in performing variable length coding on the motion vector predictor indices.

FIG. 6 is a conceptual diagram showing processes of reading from and writing to a colPic memory and a global vector storing unit.

FIG. 14 is a diagram showing examples of syntax of a bitstream in the moving picture decoding method according to Embodiment 2.

FIG. 29 shows a structure of TS packets and source packets in the multiplexed data.

FIG. 37 shows an example of a look-up table in which video data standards are associated with driving frequencies.

Figure 1:
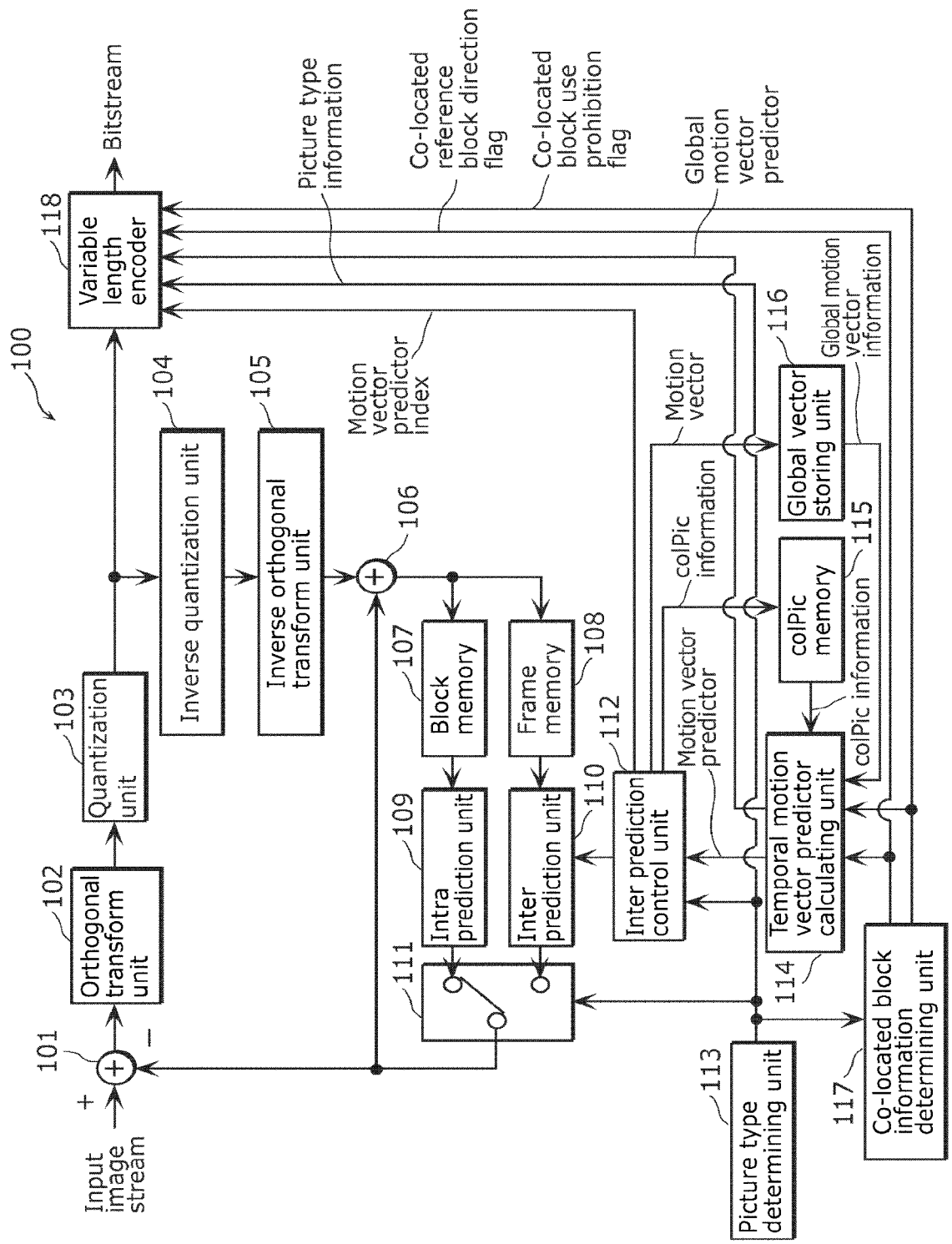
FIG. 1 is a block diagram of a moving picture coding apparatus according to Embodiment 1.

DESCRIPTION OF EMBODIMENTS (Outline of One or More Exemplary Embodiments of the Present Disclosure)

A moving picture coding method according to one exemplary embodiment of the present disclosure is a method for performing inter prediction coding on a coding target block included in a coding target picture. More specifically, the moving picture coding method including: coding the coding target block using a motion vector; generating a plurality of motion vector predictors; and coding the motion vector using one of the plurality of motion vector predictors generated in the generating, wherein, in the generating, a replacement vector which replaces a temporal motion vector predictor is included in the plurality of motion vector predictors when it is impossible to obtain the temporal motion vector predictor from a block which is included in a coded picture different from the coding target picture and corresponds to the coding target block.

With this structure, it is possible to prevent decoding error propagation while suppressing decrease in coding efficiency by selectively including a temporal motion vector predictor or a replacement vector in motion vector predictor candidates.

In addition, for example, in the generating, a motion vector having a motion quantity of 0 may be included, as the replacement vector, in the plurality of motion vector predictors when obtainment of the temporal motion vector predictor from the coded picture is prohibited.

In addition, for example, in the generating, the number of pictures coded according to the moving picture coding method may be counted, and obtainment of the temporal motion vector predictor from the coded picture may be prohibited when the coding target picture is coded, the coding target picture being a picture coded at time at which the number of coded pictures exceeds a predetermined value.

In addition, for example, the moving picture coding method may be a method of coding pictures each of which is in a base view or a dependent view included in a multi-view video, and may further include generating a parallax vector corresponding to parallax between the base view and the dependent view. In addition, in the generating, the parallax vector may be included, as the replacement vector, in the plurality of motion vector predictors when the coding target picture is in the dependent view and is a starting picture in a Group Of Pictures (GOP).

In addition, for example, the moving picture coding method may be a method of coding pictures each of which is in a base view or a dependent view included in a multi-view video, and further includes generating a parallax vector corresponding to parallax between the base view and the dependent view. In addition, for example, in the generating, the parallax vector may be included, as the replacement vector, in the plurality of motion vector predictors when obtainment of the temporal motion vector predictor from the coded picture is prohibited.

In addition, for example, the parallax vector may be calculated using a motion vector obtained when inter-view prediction is performed on each of blocks included in the picture in the dependent view, using the picture included in the base view and corresponding to the picture in the dependent view. In addition, in the generating, the parallax vector may be included, as the replacement vector, in the plurality of motion vector predictors, the parallax vector being used when coding a starting picture in a GOP immediately before the GOP including the coding target picture.

In addition, for example, the parallax vector may be calculated using a motion vector obtained when inter-view prediction is performed on each of blocks included in the dependent view, using the picture included in the base view and corresponding to the picture in the dependent view. In addition, in the generating, the parallax vector may be included, as the replacement vector, in the plurality of motion vector predictors, the parallax vector being used when coding a picture coded immediately before the coded picture.

The moving picture decoding method according to one exemplary embodiment of the present disclosure is a method for performing inter prediction decoding on a decoding target block in a decoding target picture. More specifically, the moving picture decoding method includes: generating a plurality of motion vectors; decoding the motion vector using one of the plurality of motion vector predictors generated in the generating; and decoding the decoding target block using the motion vector decoded in the decoding. In the generating, a replacement vector which replaces a temporal motion vector predictor is included in the plurality of motion vector predictors when it is impossible to obtain the temporal motion vector predictor from a block which is included in a decoded picture different from the decoding target picture and corresponds to the decoding target block.

The moving picture coding method according to one exemplary embodiment of the present disclosure is a method of coding the coding target block using a reference motion vector of a reference block included in a reference picture different from a coding target picture including the coding target block. The reference block in the reference picture is co-located with the coding target block in the coding target picture. The image coding method includes: determining a value of a predetermined flag indicating whether to use a first reference motion vector of the reference block or a second reference motion vector of the reference block at the time of motion vector coding on the coding target block; assigning a bitstream a third reference motion vector calculated from the second reference motion vector when the predetermined flag indicates use of the second reference motion vector of the reference picture; coding a motion vector for the coding target block according to the value of the predetermined flag; and a flag assigning unit of assigning the bitstream the predetermined flag.

In addition, for example, the determining may include: counting the number of coded pictures among the coding target pictures; and, when the number of coded pictures is smaller than a predetermined value, determining use of the first reference motion vector of the reference block at the time of motion vector coding on the coding target block; and when the number of coded pictures among the coding target pictures is larger than or equal to the predetermined value, determining use of the second reference motion vector of the reference block at the time of motion vector coding on the coding target block, and resetting the number.

In addition, for example, the second reference motion vector of the reference picture may be calculated from an average value of motion vectors of coded blocks in the reference picture.

In addition, for example, the second reference motion vector of the reference picture may be calculated from a motion vector which appears most frequently from among motion vectors of coded blocks in the reference picture.

In addition, for example, the coding may include, when the reference block includes two or more reference motion vectors: selecting one of the reference motion vectors, based on whether the reference picture is located forward or backward of the coding target picture; and coding the motion vector for the coding target block using the determined reference motion vector.

In addition, for example, when the reference block includes forward and backward reference motion vectors, in the selecting, the forward reference motion vector among the forward and backward reference motion vectors may be selected when the coding target block is located forward of the reference block; and the backward reference motion vector among the forward and backward reference motion vectors may be selected when the coding target block is located backward of the reference block.

In addition, for example, when the reference block includes one of the forward and backward reference motion vectors, in the selecting, one of the forward and backward reference motion vectors which is included in the reference block may be selected irrespective of a positional relationship between the reference block and the coding target block.

The moving picture decoding method according to one exemplary embodiment of the present disclosure is a method for decoding the decoding target block using a reference motion vector of a reference block included in a reference picture different from a decoding target picture including the decoding target block. The reference block in the reference picture is co-located with the decoding target block in the decoding target picture. The image decoding method includes: decoding a value of a predetermined flag indicating whether to use a first reference motion vector of the reference block or to use a second reference motion vector of the reference picture at the time of motion vector decoding for the decoding target block; decoding, from a bitstream, a third reference motion vector calculated from the second reference motion vector when the predetermined flag indicates use of the second reference motion vector of the reference picture; and decoding a motion vector of the decoding target block according to the value of the predetermined flag.

In addition, for example, the decoding may include, when the reference block includes two or more reference motion vectors: selecting one of the reference motion vectors, based on whether the reference picture is located forward or backward of the decoding target picture; and decoding the motion vector for the decoding target block using the determined reference motion vector.

In addition, for example, when the reference block includes forward and backward reference motion vectors, in the selecting, the forward reference motion vector among the forward and backward reference motion vectors may be selected when the decoding target block is located forward of the reference block; and the backward reference motion vector among the forward and backward reference motion vectors may be selected when the decoding target block is located backward of the reference block.

In addition, for example, when the reference block includes one of the forward and backward reference motion vectors, in the selecting, one of the forward and backward reference motion vectors which is included in the reference block may be selected irrespective of a positional relationship between the reference block and the coding target block.

In addition, for example, the second reference motion vector of the reference picture may be calculated from an average value of motion vectors of decoded blocks in the reference picture.

In addition, for example, the second reference motion vector of the reference picture may be calculated from a motion vector which appears most frequently from among motion vectors of decoded blocks in the reference picture.

These general and specific aspects may be implemented using a system, an apparatus, an integrated circuit, a computer program, or a computer-readable recording medium such as a CD-ROM, or any combination of systems, apparatuses, integrated circuits, computer programs, or computer-readable recording media.

Hereinafter, exemplary embodiments are described in detail with reference to the drawings.

It is to be noted that each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. In addition, among the structural elements in the following exemplary embodiments, structural elements not recited in any one of the independent claims are described as arbitrary structural elements.

It is to be noted that the term "coding" may be used to mean the term "encoding".

Embodiment 1

FIG. 1 is a block diagram of a moving picture coding apparatus which performs a moving picture coding method according to Embodiment 1.

As shown in FIG. 1, the moving picture coding apparatus 100 includes: a subtractor 101, an orthogonal transform unit 102, a quantization unit 103, an inverse quantization unit 104, an inverse orthogonal transform unit 105, an adder 106, a block memory 107, a frame memory 108, an intra prediction unit 109, an inter prediction unit 110, a switch 111, an inter prediction control unit 112, a picture type determining unit 113, a temporal motion vector predictor calculating unit 114, a colPic memory 115, a global vector storing unit 116, a co-located block information determining unit 117, and a variable length encoder 118.

The subtractor 101 obtains an input image stream including a coding target block from outside of the apparatus, obtains a prediction block from the switch 111, and outputs a residual block obtained by subtracting the prediction block from a coding target block to the orthogonal transform unit 102.

The orthogonal transform unit 102 transforms the residual block obtained from the subtractor 101 from an image domain to a frequency domain, and outputs the transform coefficients to the quantization unit 103. The quantization unit 103 quantizes the transform coefficients obtained from the quantization unit 103, and outputs the quantized coefficients to the inverse quantization unit 104 and the variable length encoder 118.

The inverse quantization unit 104 performs inverse quantization on the quantized coefficients obtained from the quantization unit, and outputs the reconstructed transform coefficients to the inverse orthogonal transform unit 105. The inverse orthogonal transform unit 105 transforms the reconstructed transform coefficients obtained from the inverse quantization unit 104 from the frequency domain to the image domain, and outputs the reconstructed residual block to the adder 106.

The adder 106 adds the reconstructed residual block obtained from the inverse orthogonal transform unit 105 and the prediction block obtained from the switch 111, and outputs the reconstructed target block to the block memory 107 and the frame memory 108. The block memory 107 stores the reconstructed input image stream on a block-byblock basis. The frame memory 108 stores the reconstructed input image stream on a frame-by-frame basis.

The picture type determining unit 113 determines the picture type to be used for the coding of the input image stream from among I-picture, B-picture, and P-picture, and generates picture type information. The picture type determining unit 113 outputs the generated picture type information to the switch 111, the inter prediction control unit 112, the co-located block information determining unit 117, and the variable length encoder 118.

The intra prediction unit 109 performs intra prediction on the coding target block using the reconstructed block-based input image stream stored in the block memory 107 to generate a prediction block, and outputs the generated prediction block to the switch 111. The inter prediction unit 110 performs inter prediction on the coding target block using the reconstructed frame-based input image stream stored in the frame memory 108 and a motion vector derived through motion estimation to generate a prediction block, and outputs the generated prediction block to the switch 111.

The switch 111 outputs the prediction block generated by the intra prediction unit 109 or the prediction block generated by the inter prediction unit 110 to the subtractor 101 and the adder 106. For example, the switch 111 outputs one of the two prediction blocks which has a smaller coding cost.

The co-located block information determining unit 117 determines whether or not to prohibit use of a co-located block. The co-located block information determining unit 117 generates, for each of pictures, a co-located block use prohibition flag indicating the result of the determination, and outputs the flag to the temporal motion vector predictor calculating unit 114 and the variable length encoder 118. This co-located block use prohibition flag is included in the bitstream (typically, in a picture header or a slice header).

In addition, the co-located block information determining unit 117 determines, as a co-located block, one of a block (hereinafter referred to as a forward reference block) which is included in a picture located forward of the coding target picture in display time order and a block (hereinafter referred to as a backward reference block) which is included in a picture located backward of the coding target picture in display time order. In other words, the forward reference block is a block included in a reference picture which is determined by a reference picture list L0. In addition, the backward reference block is a block included in a reference picture which is determined by a reference picture list L1.

The co-located block information determining unit 117 generates, for each of the pictures, a co-located reference block direction flag indicating the result of the determination, and outputs the flag to the temporal motion vector predictor calculating unit 114 and the variable length encoder 118. This co-located reference block direction flag is included in the bitstream (typically, in a picture header or a slice header). In addition, when a value indicating "prohibition" is set to the co-located block use prohibition flag, the co-located reference block direction flag may be omitted.

Here, a co-located block is a block which is in a picture different from a picture including a coding target block and is co-located with the coding target block. It is to be noted that the coding target block and the co-located block are not always need to be precisely co-located with each other in the pictures. For example, a block surrounding (neighboring) the block which is in a picture different from the coding target picture and is co-located with the coding target block may be determined as a co-located block.

The temporal motion vector predictor calculating unit 114 derives a motion vector predictor candidate using colPic information such as a motion vector of a co-located block stored in the colPic memory 115 and a global motion vector of a colPic picture stored in the global vector storing unit, according to the value of the co-located block use prohibition flag obtained from the co-located block information determining unit 117.

More specifically, when the co-located block use prohibition flag is on (prohibition), the temporal motion vector predictor calculating unit 114 adds the global motion vector (replacement vector) read from the global vector storing unit 116 to the motion vector predictor candidates. On the other hand, when the co-located block use prohibition flag is off (allowance), the temporal motion vector predictor calculating unit 114 adds the temporal motion vector predictor calculated using the colPic information read out from the colPic memory 115 to the motion vector predictor candidates.

In addition, the temporal motion vector predictor calculating unit 114 assigns the motion vector predictor added as a candidate a motion vector predictor index value. The temporal motion vector predictor calculating unit 114 outputs the motion vector predictor added as the candidate and the motion vector predictor index to the inter prediction control unit 112. On the other hand, when the co-located block does not have any motion vector, the temporal motion vector predictor calculating unit 114 stops the motion vector derivation in a temporal motion vector predictor mode or derives a motion vector having a motion quantity of 0 as a motion vector predictor candidate. In addition, the temporal motion vector predictor calculating unit 114 outputs the global motion vector to the variable length encoder 118.

The inter prediction control unit 112 determines that a motion vector is coded using a motion vector predictor candidate having the minimum difference from a motion vector derived through motion estimation from among a plurality of motion vector predictor candidates. Here, for example, a difference shows the value of difference between the motion vector predictor candidate and the motion vector derived through the motion estimation.

In addition, the inter prediction control unit 112 generates a motion vector predictor index corresponding to the determined motion vector predictor on a block-by-block basis. Next, the inter prediction control unit 112 transmits the motion vector predictor index, and the value of difference between the motion vector and the motion vector predictor to the variable length encoder. In addition, the inter prediction control unit 112 transmits colPic information including the motion vector etc. for the coding target block to the colPic memory 115. In addition, the inter prediction control unit 112 transmits the motion vector etc. for the coding target block to the global vector storing unit 116.

The colPic information including the motion vector etc. for the coding target block is stored in the colPic memory 115 for use as a vector predictor at the time of coding a next picture. A global motion vector calculated from the motion vectors for the coding target blocks in the whole picture is stored in the global vector storing unit 116 for use as a vector predictor at the time of coding the next picture.

The variable length encoder 118 generates a bitstream by performing a variable length coding process on: the quantized coefficients obtained from the quantization unit 103; the motion vector predictor index, the value of difference between the motion vector and the motion vector predictor obtained from the inter prediction control unit 112; the picture type information obtained from the picture type determining unit 113; the co-located block use prohibition flag and the co-located reference block direction flag obtained from the co-located block information determining unit 117; and the temporal global motion vector predictor obtained from the temporal motion vector predictor calculating unit 114.

Figure 2:
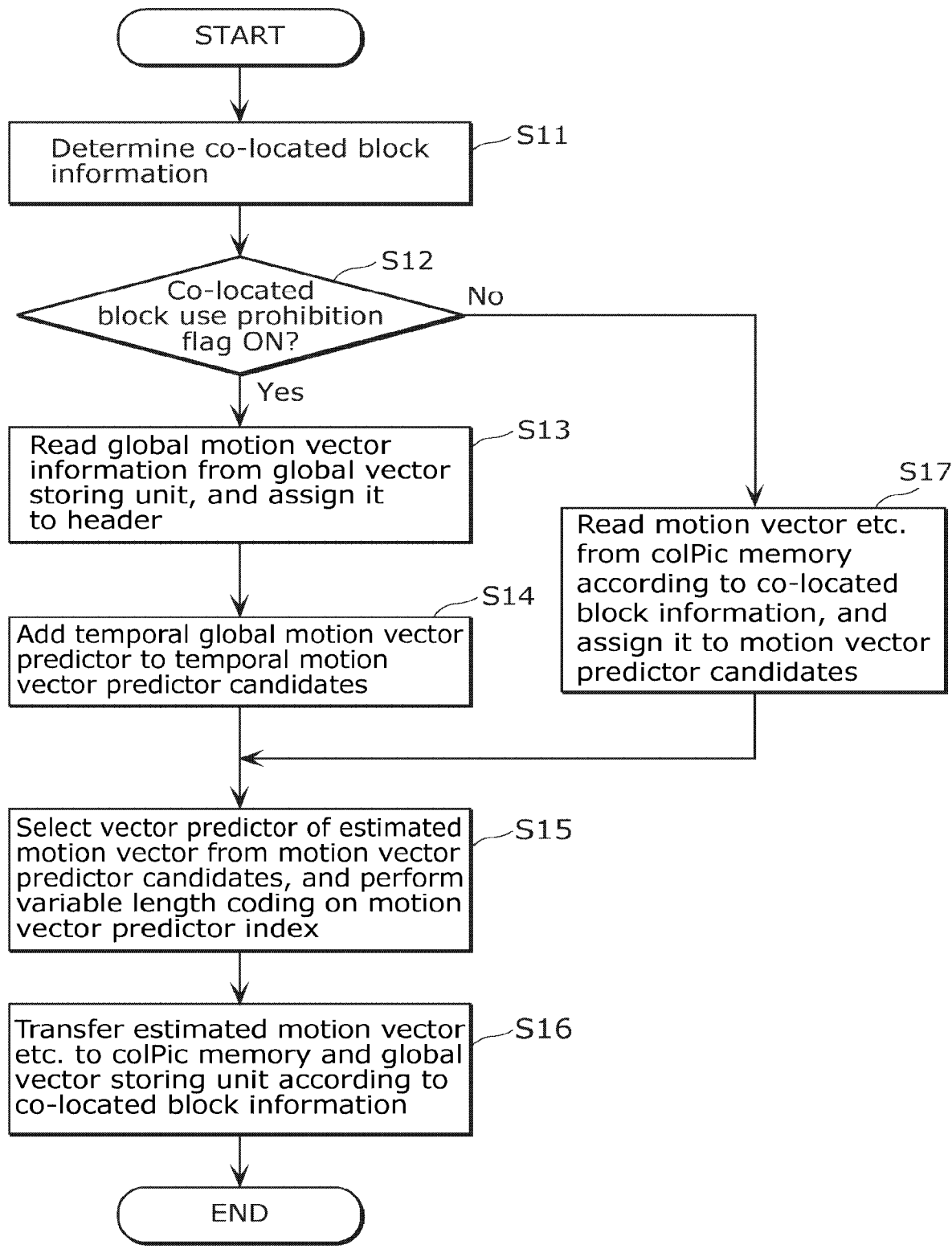
FIG. 2 is a diagram showing a schematic flow of processes in a moving picture coding method according to Embodiment 1.

FIG. 2 is a diagram showing a schematic flow of processes in a moving picture coding method according to Embodiment 1.

The co-located block information determining unit 117 determines co-located block information such as co-located block use prohibition flag and co-located reference block direction flag according to a later-described method when deriving a motion vector predictor candidate in the temporal motion vector predictor mode (S11).

Next, the temporal motion vector predictor calculating unit 114 determines whether or not the co-located block use prohibition flag is on (prohibition) (S12). When the result of the determination is true (Yes in S12), the temporal motion vector predictor calculating unit 114 reads a global motion vector from the global vector storing unit 116 and adds the read-out global motion vector to header information such as a picture header (S13).

Next, the temporal motion vector predictor calculating unit 114 adds the global motion vector, as a replacement vector which replaces the temporal motion vector predictor, to motion vector predictor candidates. In addition, the temporal motion vector predictor calculating unit 114 assigns the motion vector predictor added as the candidate a motion vector predictor index value.

On the other hand, when the co-located block use prohibition flag is off (No in S12), the temporal motion vector predictor calculating unit 114 reads colPic information including a reference motion vector etc. for a co-located block from the colPic memory according to the co-located block information, and adds a temporal motion vector predictor calculated using the reference motion vector of the co-located block to the motion vector predictor candidates (S17). In addition, the temporal motion vector predictor calculating unit 114 assigns the motion vector predictor added as the candidate a motion vector predictor index value.

In general, a smaller motion vector predictor index value shows a smaller amount of necessary information. On the other hand, a larger motion vector predictor index value shows a larger amount of necessary information. Accordingly, coding efficiency is increased when a small motion vector predictor index value is assigned to a motion vector having a high possibility of becoming a highly accurate motion vector.

Next, the inter prediction unit 110 performs inter prediction using a motion vector derived through motion estimation to generate a prediction block for the coding target block. Subsequently, the subtractor 101, the orthogonal transform unit 102, the quantization unit 103, and the variable length encoder 118 operate to perform coding processes on the coding target block using the prediction block generated by the inter prediction unit 110.

In addition, the inter prediction control unit 112 codes a motion vector using a motion vector predictor having the minimum difference from the motion vector selected from among the plurality of motion vector predictor candidates. The inter prediction control unit 112 determines, to be differences, the values of differences between the respective motion vector predictor candidates and the motion vector derived through the motion estimation, and determines the motion vector predictor having the minimum difference to be a motion vector predictor for use in the coding of the motion vector.

Next, the inter prediction control unit 112 outputs the motion vector predictor index corresponding to the selected motion vector predictor, and the difference information between the motion vector and the motion vector predictor to the variable length encoder 118. The variable length encoder 118 performs variable length coding on the motion vector index and the difference information obtained from the inter prediction control unit 112, and includes them in the bitstream.

Next, the inter prediction control unit 112 stores the colPic information including the motion vector etc. used in the inter prediction in the colPic memory 115. In order to calculate a temporal motion vector predictor for the coding target block, a motion vector in a reference picture, an index value of the reference picture, and a prediction direction etc. are stored in the colPic memory 115. In addition, the inter prediction control unit 112 stores a motion vector etc. used in the inter prediction in the global vector storing unit 116 (S16).

Figure 3:
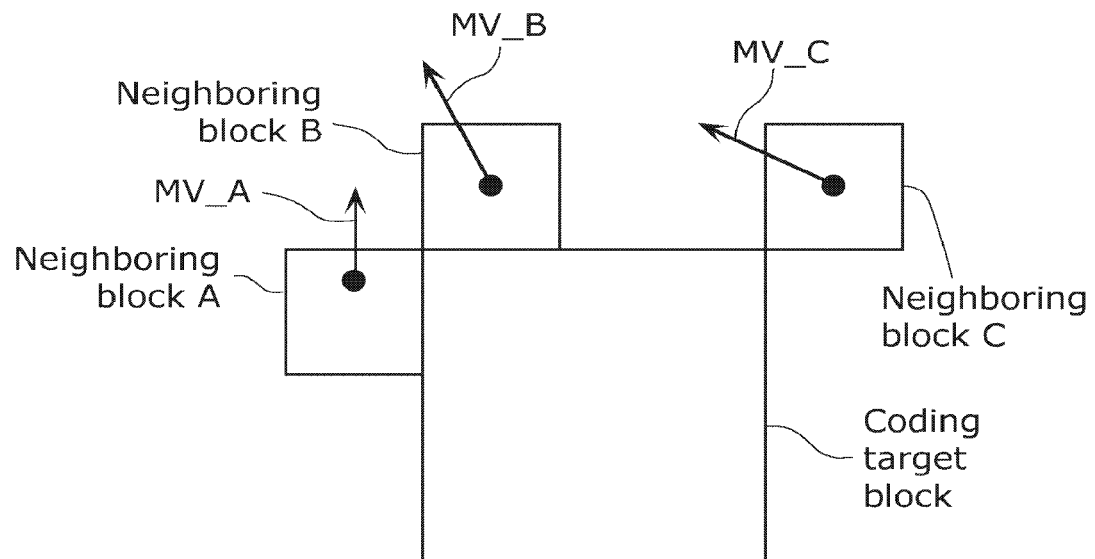
FIG. 3 shows examples of motion vector predictor candidates.

FIG. 3 shows examples of motion vector predictor candidates. A motion vector A (MV_A) is a motion vector for a neighboring block A located to the left of the coding target block. A motion vector B (MV_B) is a motion vector for a neighboring block B located above the coding target block. A motion vector C (MV_C) is a motion vector of a neighboring block C located right above the coding target block. In addition, Median (of MV_A, MV_B, MV_C) shows a median value of the motion vectors A, B, and C. Here, the median value is derived using, for example, Expressions 1 to 3 as shown below.

[Math. 1]

$$\text{Median}(x, y, z) = \\ x + y + z - \text{Min}(x, \text{Min}(y, z)) - \text{Max}(x, \text{Max}(y, z))$$

(Expression 1)

[Math. 2]

$$\text{Min}(x, y) = \begin{cases} x & (x \leq y) \\ y & (x > y) \end{cases}$$

(Expression 2)

[Math. 3]

$$\text{Max}(x, y) = \begin{cases} x & (x \geq y) \\ y & (x < y) \end{cases}$$

(Expression 3)

The motion vector predictor index values are as follows: the value corresponding to the Median (of MV_A, MV_B, MV_C) is 0; the value corresponding to the motion vector A is 1; the value corresponding to the motion vector B is 2; the value corresponding to the motion vector C is 3; and the value corresponding to the temporal motion vector predictor (or a replacement vector) is 4. How to assign values to the motion vector predictor indices are not limited to this example.

FIG. 4 shows an example of a code table for use in performing variable length coding on the motion vector predictor indices. In the example of FIG. 4, codes are assigned to the motion vector predictor indices such that a code having a shorter code length is assigned to a motion vector predictor index having a smaller value. Accordingly, it is possible to increase the coding efficiency by assigning a small motion vector index value to a motion vector predictor candidate having a high possibility of yielding a high prediction accuracy.

Figure 5:
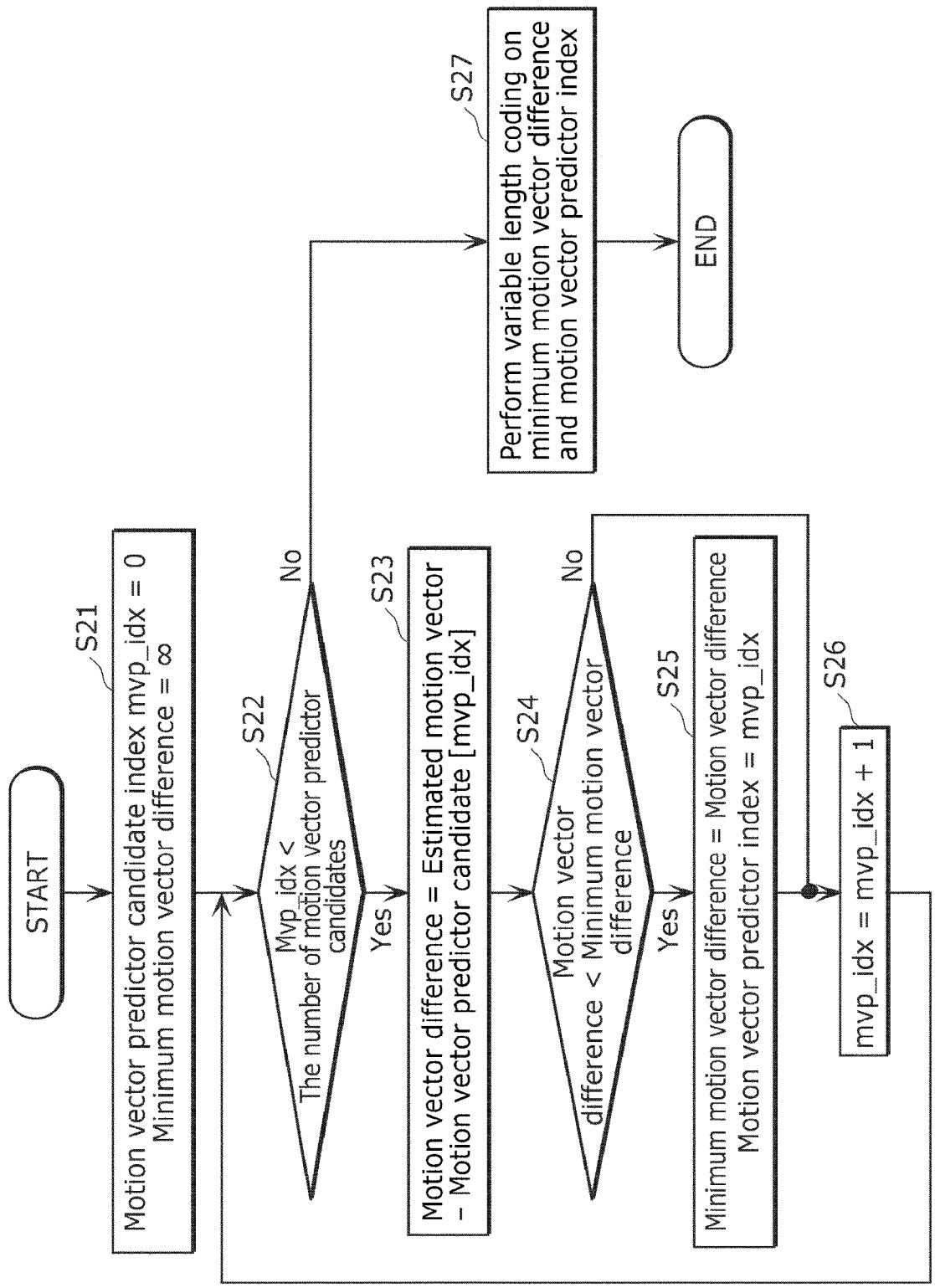
FIG. 5 shows a flow of determining a motion vector predictor candidate.

FIG. 5 is a diagram of a motion vector predictor candidate determination flow performed by the inter prediction control unit 112. According to the flow shown in FIG. 5, the motion vector predictor candidate having the minimum difference from the motion vector derived through the motion estimation is determined to be the motion vector predictor which is used when the motion vector is coded. Next, the information about the difference between the motion vector and the motion vector predictor and the motion vector predictor index indicating the determined motion vector predictor are variable-length coded and included in the bitstream.

More specifically, first, the inter prediction control unit 112 initializes the motion vector predictor candidate index mvp_idx and the minimum motion vector difference (S21). Next, the inter prediction control unit 112 compares a motion vector predictor candidate index mvp_idx and the number of motion vector predictors (the number of records in a table shown in FIG. 3) (S22).

When mvp_idx<the number of motion vector predictors is satisfied (Yes in S22), the inter prediction control unit 112 calculates a motion vector difference (difference information) using one of the plurality of motion vector predictor candidates (S23). For example, the inter prediction control unit 112 calculates a motion vector difference by subtracting a motion vector predictor having a motion vector predictor index of 0 in FIG. 3 from a motion vector used to code a coding target block.

Next, the inter prediction control unit 112 compares the motion vector difference calculated in Step S23 and the minimum motion vector difference (S24). When a motion vector difference<the minimum motion vector difference is satisfied (Yes in S24), the inter prediction control unit 112 sets (overwrites) the motion vector difference calculated in Step S23 to the minimum motion vector difference, and sets (overwrites) the current mvp_idx to the motion vector predictor index (S25). On the other hand, when a motion vector difference the minimum motion vector difference is satisfied (No in S24), Step S25 is skipped.

The inter prediction control unit 112 increments the mvp_idx by 1 (S26), and repeatedly executes the above-described processes by the number of times corresponding to the number of motion vector predictors (Steps S22 to S26). The inter prediction control unit 112 outputs the minimum motion vector difference and a value which is set to the motion vector predictor index to the variable length encoder 118 at the time when mvp_idx=the number of motion vector predictor candidates is satisfied (S22), to complete the processes in FIG. 5 (S27).

FIG. 6 is a conceptual diagram showing processes of reading from and writing into the colPic memory 115 and the global vector storing unit 116 shown in FIG. 1. In FIG. 6, a motion vector mvCol1 in a prediction direction 1 and a motion vector mvCol2 in a prediction direction 2 of the co-located block in a co-located picture colPic are stored in the colPic memory 115 and the global vector storing unit 116.

Here, the co-located block is a block which is in the co-located picture colPic and is co-located with the coding target block. In addition, whether the co-located picture colPic is the one located backward of the coding target picture or the one located forward of the coding target picture is switched according to a co-located reference block direction flag. When the coding target block is coded, the colPic information including the motion vector etc, stored in the colPic memory 115 or the global motion vector in the global vector storing unit 116 is read out according to the co-located block use prohibition flag, and is added to the motion vector predictor candidates.

The motion vector predictor candidate is used to code a motion vector for the coding target block. Embodiment 1 is described taking the example where the prediction direction 1 and the prediction direction 2 are determined to be the forward reference direction and the backward reference direction, respectively. However, it is to be noted that the prediction direction 1 and the prediction direction 2 may be determined to be the backward reference direction and the forward reference direction, respectively, or both of the prediction directions 1 and 2 may be determined to be either the forward reference direction or the backward reference direction.

The global vector storing unit 116 stores the global motion vector calculated from the motion vectors for the coding target blocks of the coding target picture. For example, it is conceivable to determine, to be the global motion vector, an average value of the motion vectors in each prediction direction at the time of inter prediction coding of the whole coding target picture. Embodiment 1 has been described taking the non-limiting example of using, as the global vector, the average value of motion vectors for the coding target blocks of the coding target picture.

However, for example, it is also possible to determine, as the global motion vector, a median value or a weighted average value of motion vectors at the time of performing inter prediction coding on the coding target blocks of the coding target picture. Alternatively, it is also possible to determine, as the global motion vector, the value of a motion vector having a highest appearance frequency among motion vectors at the time of performing inter prediction coding on the coding target blocks of the coding target picture. Alternatively, it is also possible to determine, as the global motion vector, the value of a motion vector which refers to a closet picture in display order among motion vectors at the time of the inter prediction coding of the coding target blocks of the coding target picture.

Figure 7A:
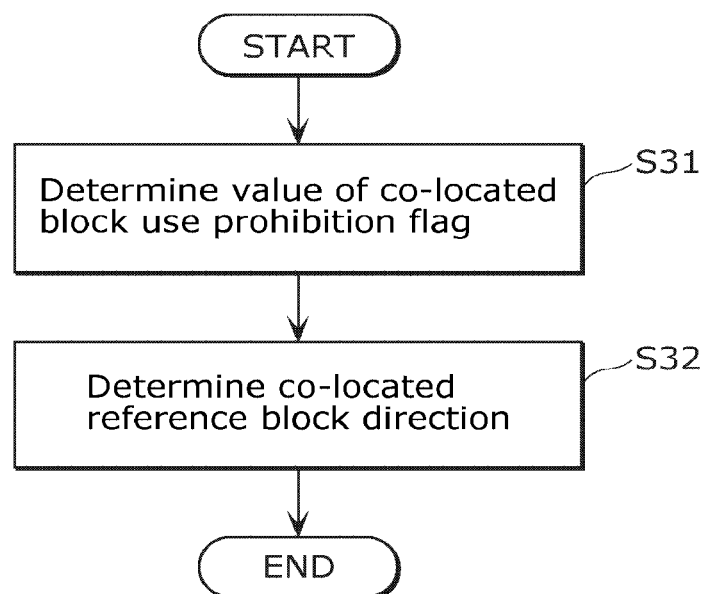
FIG. 7A is a diagram showing detailed processing flow of Step S11 in FIG. 2.

FIG. 7A is a diagram showing detailed processing flow of Step S11 in FIG. 2. Hereinafter, FIG. 7A is described.

First, the co-located block information determining unit 117 determines whether or not to use the temporal motion vector predictor mode using a co-located block for the coding target picture (S31). Next, the co-located block information determining unit 117 generates, on a picture-by-picture basis, a co-located block use prohibition flag indicating whether or not use of a co-located block is allowed (a temporal direct mode is allowed), and outputs the co-located block use prohibition flag to the variable length encoder 118.

For example, in streaming distribution or the like, it is conceivable that a co-located block use prohibition flag is on at certain intervals in order to reduce propagation of a decoding error due to the temporal motion vector predictor mode. As an example for achieving this, a method is possible which involves preparing a counter for counting the number of coded pictures among the coding target pictures, turning off a co-located block use prohibition flag when the number of coded pictures is smaller than a threshold value, and when the number of coded pictures amounts to the threshold value, turning on co-located block use prohibition flag to reset the counter to 0.

In addition, for example, a method is possible which is intended to reduce decoding error propagation by turning on a co-located block use prohibition flag for each of pictures which can be reference targets (such as a P-picture, and a B-picture which can be referred to by another picture) and turning off a co-located block use prohibition flag for a picture which cannot be a reference target (such as a B-picture which cannot be referred to by any other picture). In this way, it is possible to effectively reduce such decoding error propagation by turning on the co-located block use prohibition flag for each picture which is referred to by another picture.

Next, the co-located block information determining unit 117 determines, to be a co-located block, one of a forward reference block and a backward reference block (S32). As a conceivable example, the co-located block information determining unit 117 determines, to be the co-located block, one of a co-located block (a forward reference block) included in a forward reference picture and a co-located block (a backward reference block) included in a backward reference picture which is closer to the coding target picture in distance in display order. Next, the co-located block information determining unit 117 generates, on a picture-by-picture basis, a co-located reference block direction flag indicating whether the co-located block is the forward reference block or the backward reference block, and outputs the co-located reference block direction flag to the variable length encoder 118.

Figure 7B:
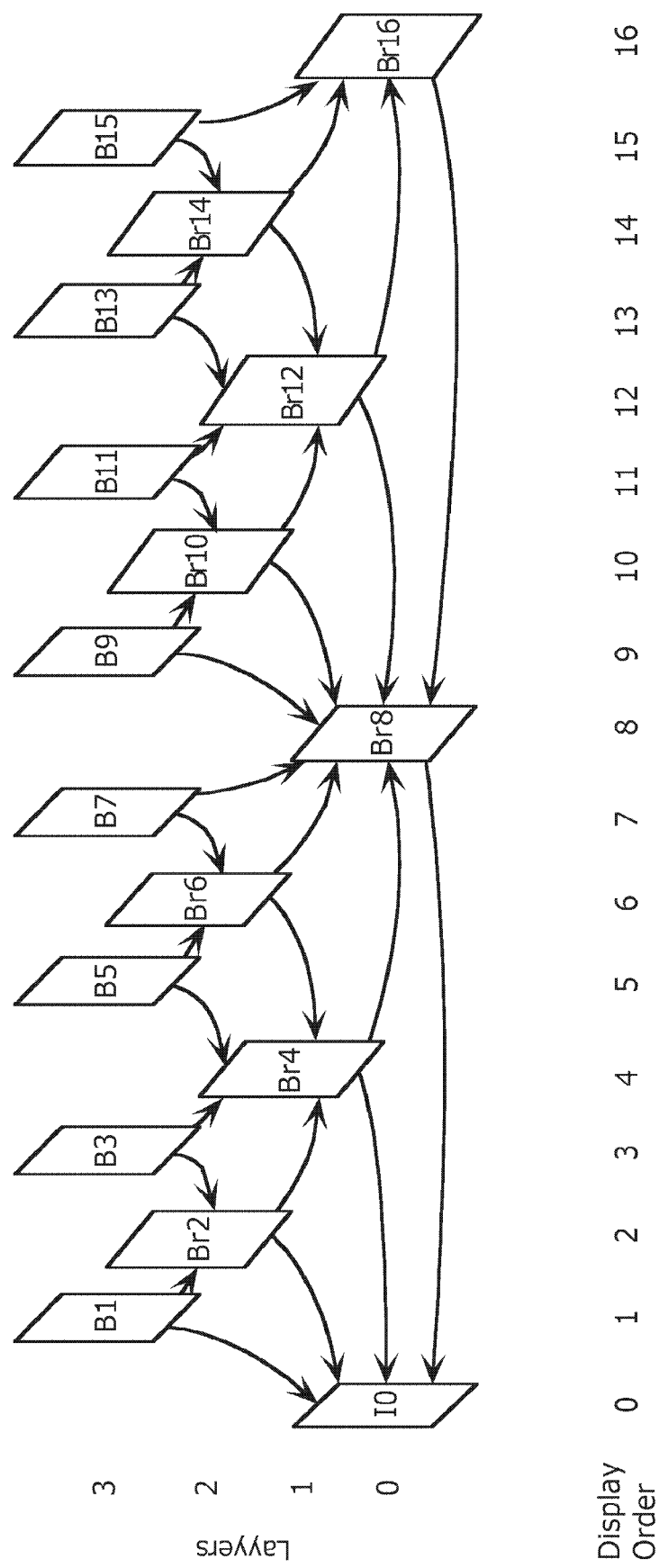
FIG. 7B shows examples of B-pictures which are referred to by other pictures.

FIG. 7B shows examples of B-pictures which are referred to by other pictures. FIG. 7B defines a reference structure composed of a plurality of layers. A stream is started with an I-picture, and the pictures other than the starting I-picture are B-pictures. In addition, in the structure, the picture belonging to a higher level layer among the plurality of layers refers to a picture belonging to the same level layer or a picture belonging to a lower level layer.

For example, in FIG. 7B, a picture B1 belonging to a layer 3 refers to a picture I0 belonging to a layer 0 and a picture Br2 belonging to a layer 2. In addition, a picture Bf8 belonging to the lowermost level layer 0 refers to the picture I0 in the same layer. Here, in the structure, each of the pictures belonging to the lowermost level layer 0 refers to only a picture located forward thereof in display order. In this reference structure, a conceivable method involves turning on a co-located block use prohibition flag for each of the pictures belonging to the layer 0 which has a high possibility of being referred to by another picture.

Figure 8:
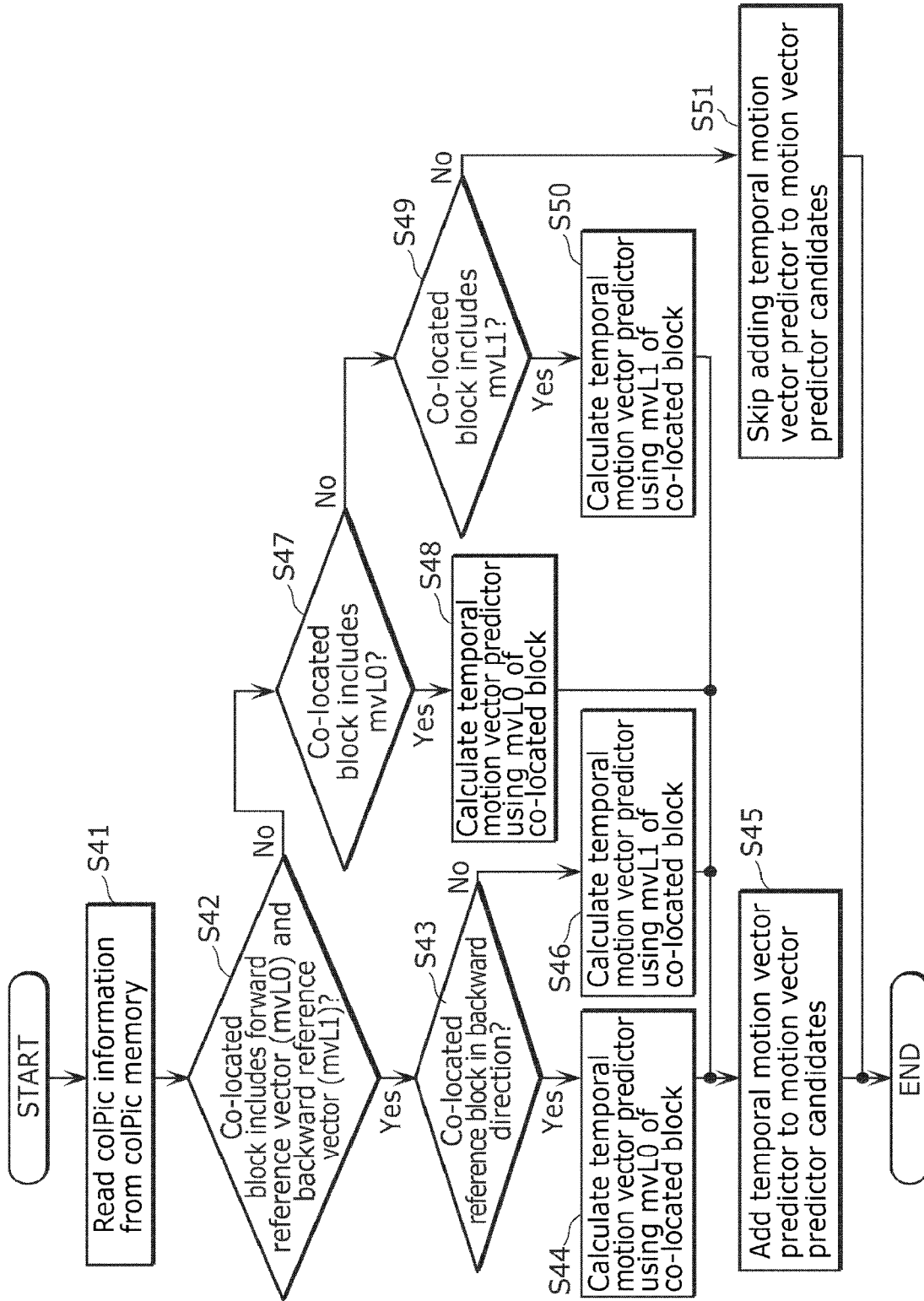
FIG. 8 is a diagram showing detailed processing flow of Step S17 in FIG. 2.

FIG. 8 is a diagram showing detailed processing flow of Step S17 in FIG. 2. Hereinafter, FIG. 8 is described.

First, the temporal motion vector predictor calculating unit 114 reads, from the colPic memory 115, colPic information including a reference motion vector in a prediction direction 1 and a reference motion vector in a prediction direction 2 etc. (S41). Next, the temporal motion vector predictor calculating unit 114 determines whether or not the co-located block included in the colPic information has two or more motion vectors (S42). In other words, the temporal motion vector predictor calculating unit 114 determines whether or not the co-located block has a forward reference motion vector (mvL0) and a backward reference motion vector (mvL1).

When determining that the co-located block has two or more motion vectors (Yes in S42), the temporal motion vector predictor calculating unit 114 determines whether or not the co-located block is the backward reference block (S43). In other words, the temporal motion vector predictor calculating unit 114 determines whether or not the picture including the co-located block is located backward of the coding target picture in display order.

Next, when determining that the co-located block is the backward reference block (Yes in S43), the temporal motion vector predictor calculating unit 114 derives a temporal motion vector predictor using a forward reference motion vector (a motion vector mvL0 corresponding to a reference picture in a reference picture list L0) of the co-located block in the temporal motion vector predictor mode (S44). Next, the temporal motion vector predictor calculating unit 114 adds the temporal motion vector predictor calculated in Step S44 to the motion vector predictor candidates (S45).

On the other hand, when determining that the co-located block is the forward reference block (No in S43), the temporal motion vector predictor calculating unit 114 derives a temporal motion vector predictor using a backward reference motion vector (a motion vector mvL1 corresponding to a reference picture in a reference picture list L1) of the co-located block in the temporal motion vector predictor mode (S46), and adds the temporal motion vector predictor to the motion vector predictor candidates (S45).

On the other hand, when determining that the co-located block has only one of the forward reference block and the backward reference block (No in S42), the temporal motion vector predictor calculating unit 114 determines whether or not the co-located block has a forward reference motion vector (S47). When determining that the co-located block has the forward reference motion vector (Yes in S47), the temporal motion vector predictor calculating unit 114 derives a temporal motion vector predictor for the coding target block using the forward reference motion vector of the co-located block (S48), and adds the temporal motion vector predictor to the motion vector predictor candidates (S45).

On the other hand, when determining that the co-located block does not have any forward reference block (No in S47), the temporal motion vector predictor calculating unit 114 determines whether or not the co-located block has a backward reference motion vector (S49). When determining that the co-located block has a backward reference block (Yes in S49), the temporal motion vector predictor calculating unit 114 derives a temporal motion vector predictor for the coding target block using the backward reference motion vector (S50), and adds the temporal motion vector predictor to the motion vector predictor candidates (S45).

On the other hand, when determining that the co-located block does not have any backward reference motion vector (No in S49), the temporal motion vector predictor calculating unit 114 terminates the processes in FIG. 8 without adding the temporal motion vector predictor to the motion vector predictor candidates (S51). Alternatively, the temporal motion vector predictor calculating unit 114 may determine the value of a temporal motion vector predictor for the co-located block to be 0 (determine the temporal motion vector predictor to be a motion vector having a motion quantity of 0), and add the temporal motion vector predictor to the motion vector predictor candidates.

In the processing flow in FIG. 8, whether or not the co-located block has a forward reference motion vector is determined in Step S47, and whether or not the co-located block has a backward reference motion vector is determined in Step S49. However, it is to be noted that the processing flow is a non-limiting example. For example, it is also good to determine whether or not a co-located block has a backward reference motion vector, and then determine whether or not the co-located block has a forward reference motion vector.

Figure 9:
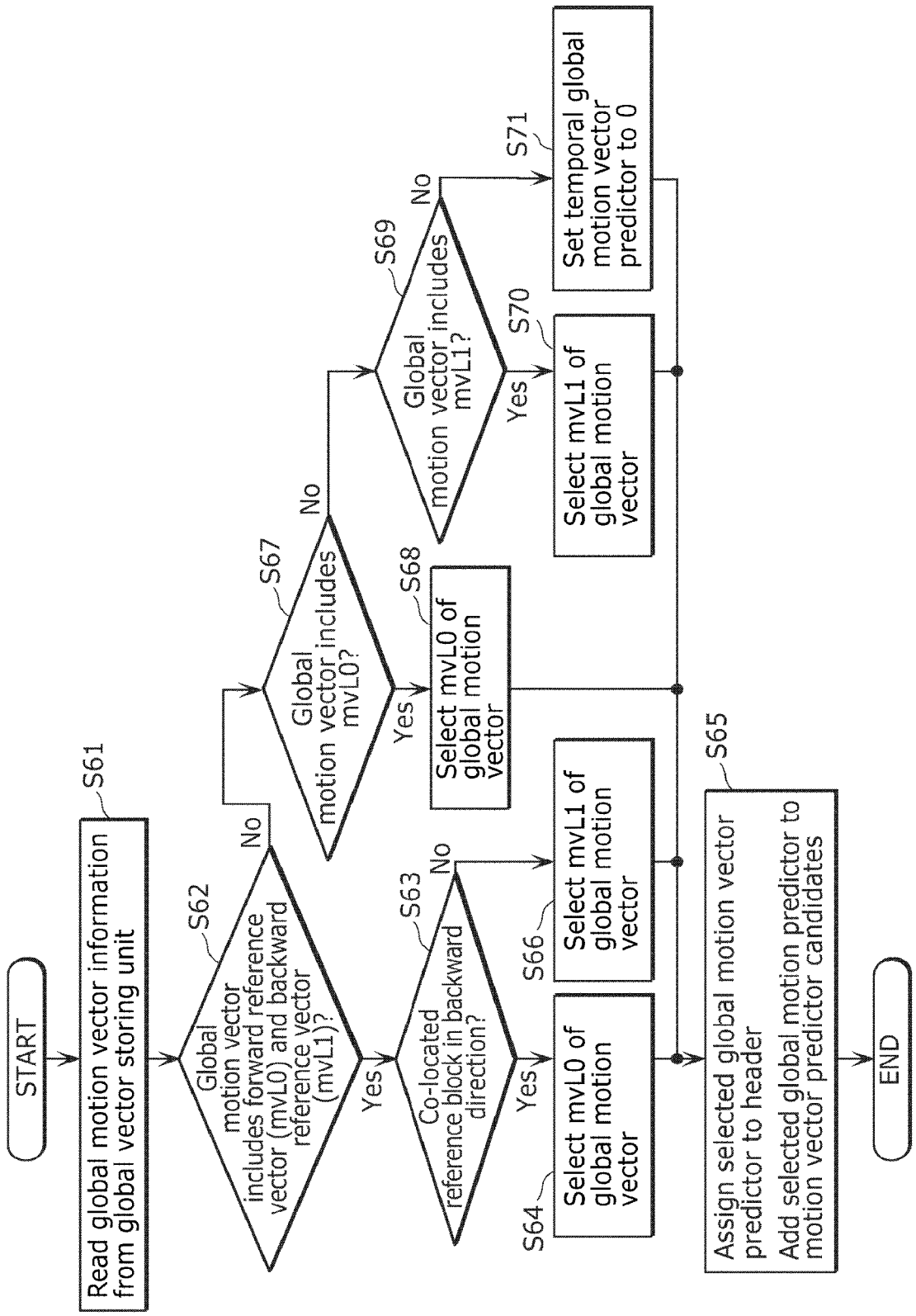
FIG. 9 is a diagram showing detailed processing flow of Steps S13 and S14 in FIG. 2.

FIG. 9 is a diagram showing detailed processing flow of Steps S13 and S14 in FIG. 2. Hereinafter, FIG. 9 is described.

First, the temporal motion vector predictor calculating unit 114 reads, from the global vector storing unit 116, global motion vector information including a global motion vector in the prediction direction 1 and/or a global motion vector in the prediction direction 2 (S61). Next, the temporal motion vector predictor calculating unit 114 determines whether or not the global motion vector information includes two or more motion vectors (S62). In other words, the temporal motion vector predictor calculating unit 114 determines whether or not a forward reference motion vector (mvL0) and a backward reference motion vector (mvL1) are included in the global motion vector information.

When determining that the global motion vector information includes two or more motion vectors (Yes in S62), the temporal motion vector predictor calculating unit 114 determines the co-located reference block direction is a direction in which a backward reference block is present (S63). When determining that the co-located reference block direction is a direction in which the backward reference block is present (Yes in S63), the temporal motion vector predictor calculating unit 114 selects a forward reference motion vector in the global motion vector information (S64).

Next, the temporal motion vector predictor calculating unit 114 adds the selected global motion vector to header information such as a picture header (outputs it to the variable length encoder 114), and adds the selected global motion vector to the motion vector predictor candidates for the coding target block (S65). It is to be noted that the temporal motion vector predictor calculating unit 114 adds, to the header information, the information for identifying the reference picture which is referred to by the selected global motion vector (more specifically, the reference picture is referred to by a plurality of motion vectors for use in the calculation of the global motion vector). This information is used in a scaling process which is described later with reference to FIG. 10A to FIG. 11B.

On the other hand, when determining that the co-located reference block direction is a direction in which a forward reference block is present (No in S63), the temporal motion vector predictor calculating unit 114 selects a backward reference motion vector in the global motion vector information (S66). Next, the temporal motion vector predictor calculating unit 114 adds the selected global motion vector to header information such as a picture header, and adds the global motion vector to the motion vector predictor candidates for the coding target block (S65).

In addition, when determining that the global motion vector information includes only one of the forward reference block and the backward reference block (No in S62), the temporal motion vector predictor calculating unit 114 determines whether or not the global motion vector information includes a forward reference motion vector (S67).

When determining that the global motion vector information includes the forward reference motion vector (Yes in S67), the temporal motion vector predictor calculating unit 114 selects the forward reference motion vector for the global motion vector information (S68). Next, the temporal motion vector predictor calculating unit 114 adds the selected global motion vector to header information such as a picture header, and adds the global motion vector to the motion vector predictor candidates for the coding target block (S65).

On the other hand, when determining that the global motion vector information does not include any forward reference block (No in S67), the temporal motion vector predictor calculating unit 114 determines whether or not the global motion vector information includes a backward reference motion vector (S69). When determining that the global motion vector information includes the backward reference motion vector (Yes in S69), the temporal motion vector predictor calculating unit 114 selects the backward reference motion vector for the global motion vector information (S70). Next, the temporal motion vector predictor calculating unit 114 adds the selected global motion vector to header information such as a picture header, and adds the global motion vector to the motion vector predictor candidates for the coding target block (S65).

On the other hand, when determining that the global motion vector information does not include any backward reference motion vector (No in S67), the temporal motion vector predictor calculating unit 114 does not add the temporal motion vector predictor to motion vector predictor candidates or determine the value of the global motion vector to be 0 (S71). Next, the temporal motion vector predictor calculating unit 114 adds the set global motion vector to header information such as a picture header, and adds the global motion vector to the motion vector predictor candidates for the coding target block (S65).

In the processing flow in FIG. 9, whether or not the global motion vector information includes a forward reference motion vector is determined in Step S67, and whether or not the global motion vector information includes a backward reference motion vector is determined in Step S69. However, it is to be noted that the processing flow is a non-limiting example. For example, it is also good to determine whether or not the global motion vector information includes the backward reference motion vector, and then determine whether or not the global motion vector information includes the forward reference motion vector.

In addition, as an example, which one of the global motion vectors mvL0 and mvL1 is selected is determined according to the co-located reference block direction flag in Steps S63 to S66 in FIG. 9. However, one or more non-limiting embodiments of the present disclosure are not limited to the example. For example, it is also good to select the global motion vector mvL0 as a motion vector predictor candidate in the reference picture list L0 and select the global motion vector mvL1 as a motion vector predictor candidate in the reference picture list L1. This eliminates the need that a co-located reference block direction flag is added to a header when the global motion vector is used, which further increases the coding efficiency.

Next, a detailed description is given of a scaling method performed when adding a temporal motion vector predictor to motion vector predictor candidates. It is to be noted that the scaling method performed to add the global motion vector to the motion vector predictor candidates is the same as the scaling method performed to add the temporal motion vector predictor to the motion vector predictor candidates except for using, as an input, the global motion vector instead of a reference motion vector for a co-located block.

Figure 10A:
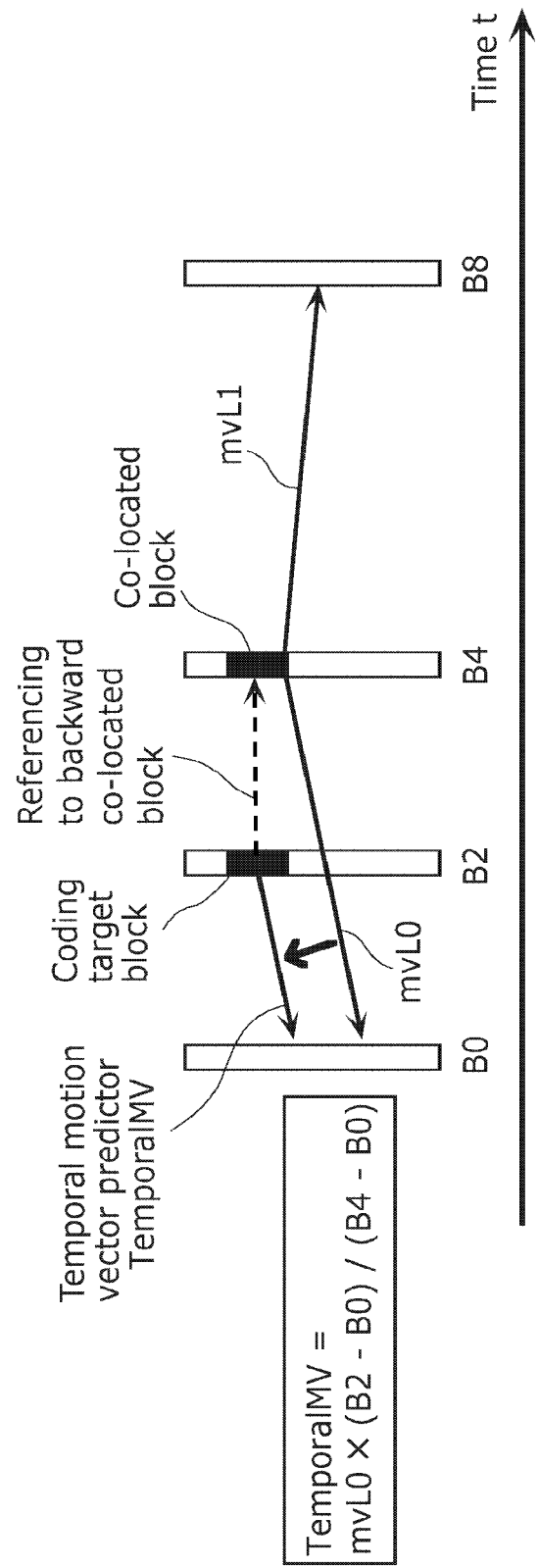
FIG. 10A is a diagram showing an exemplary method of deriving a motion vector predictor candidate using a forward reference motion vector.

FIG. 10A shows a method of deriving a motion vector predictor candidate (temporal motion vector predictor) using a forward reference motion vector in the temporal motion vector prediction mode when a co-located block is a backward reference block and includes a forward reference motion vector and a backward reference motion vector. More specifically, a motion vector predictor candidate (TemporalMV) is derived using the forward reference motion vector according to Expression 4 below.

$$TemporalMV = mvL0 \times (B2-B0)/(B4-B0) \qquad \text{(Expression 4)}$$

Here, (B2−B0) is time difference information indicating the difference between display time of a picture B2 and display time of a picture B0. Likewise, (B4−B0) is time difference information indicating the difference between display time of a picture B4 and display time of a picture B0.

Figure 10B:
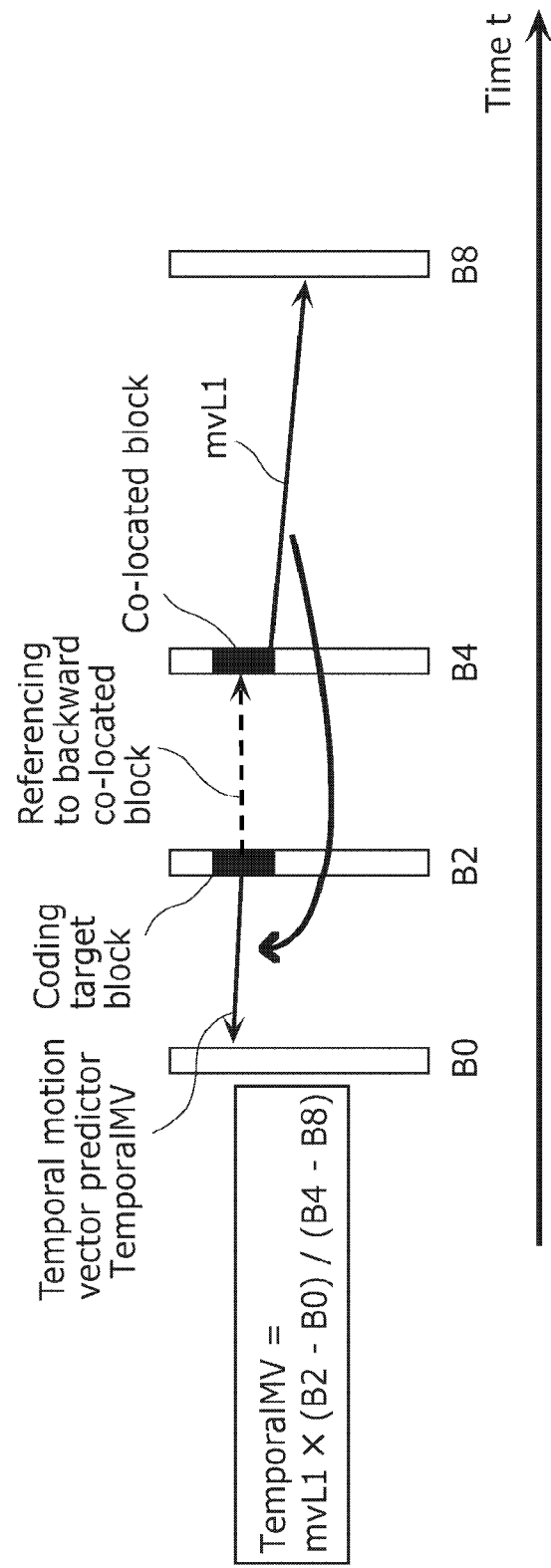
FIG. 10B is a diagram showing an exemplary method of deriving a motion vector predictor candidate using a backward reference motion vector.

FIG. 10B shows a method for deriving a motion vector predictor candidate (temporal motion vector predictor) using the backward reference motion vector in the temporal motion vector predictor mode. More specifically, a motion vector predictor candidate is derived using the backward reference motion vector according to Expression 5 below.

$$\text{TemporalMV}=mvL1\times(B2-B0)/(B4-B8) \quad \text{(Expression 5)}$$

Figure 11A:
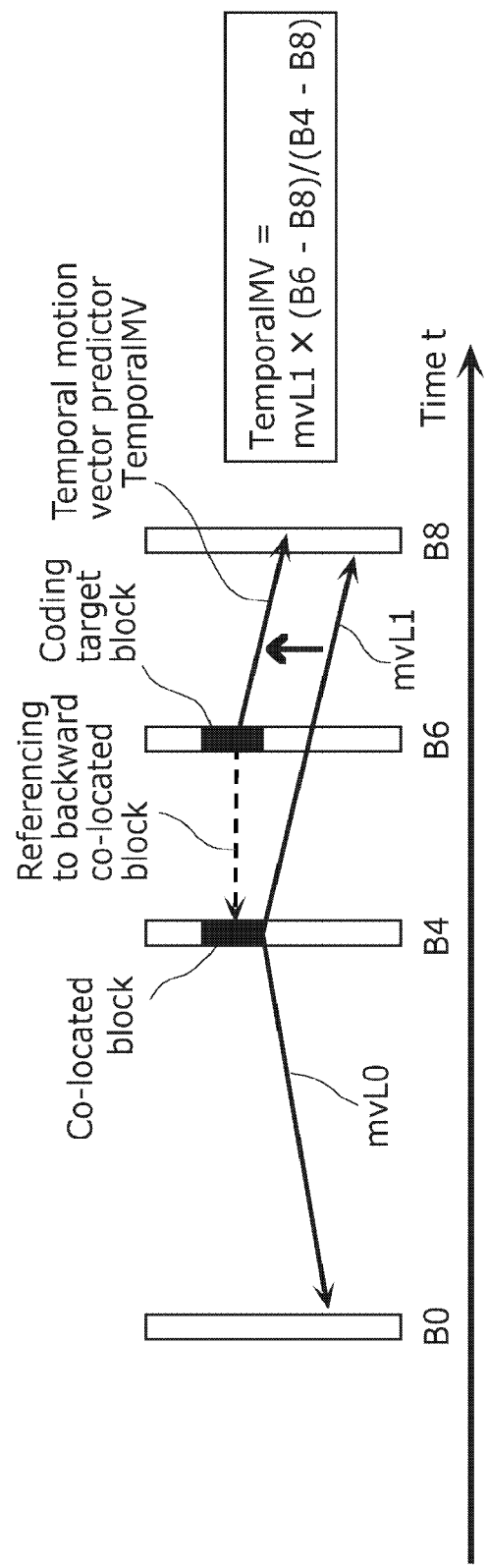
FIG. 11A is a diagram showing an exemplary method of deriving a motion vector predictor candidate using a backward reference motion vector.

FIG. 11A shows a method for deriving a motion vector predictor candidate (temporal motion vector predictor) using a backward reference motion vector in the temporal motion vector prediction mode when a co-located block is a forward reference block and includes a forward reference motion vector and a backward reference motion vector. More specifically, a motion vector predictor candidate is derived using the backward reference motion vector according to Expression 6 below.

$$\text{TemporalMV}=mvL1\times(B6-B8)/(B4-B8) \quad \text{(Expression 6)}$$

Figure 11B:
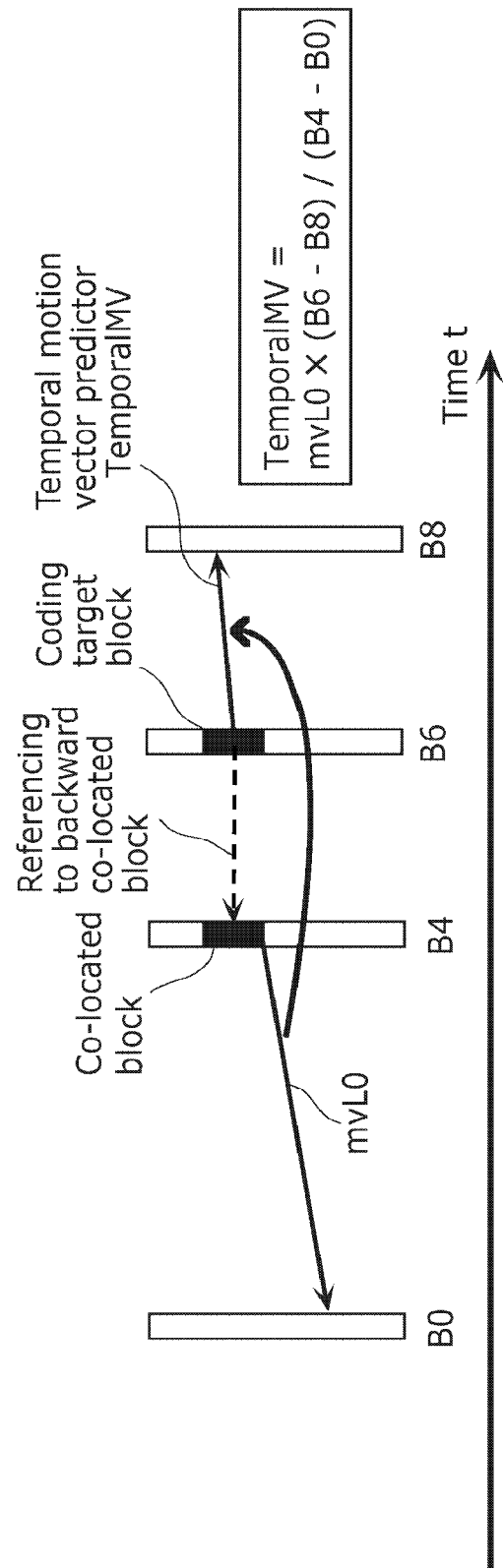
FIG. 11B is a diagram showing an exemplary method of deriving a motion vector predictor candidate using a forward reference motion vector.

FIG. 11B shows a method for deriving a motion vector predictor candidate (temporal motion vector predictor) using the forward reference motion vector in the temporal motion vector predictor mode. A motion vector predictor candidate is derived using the backward reference motion vector according to Expression 7 below.

$$\text{TemporalMV}=mvL0\times(B6-B8)/(B4-B0) \quad \text{(Expression 7)}$$

As described above, the present invention makes it possible to prevent propagation of a decoding error while suppressing decrease in coding efficiency by turning off, at constant intervals, the temporal motion vector predictor mode using a motion vector for a current coding unit in a reference picture and instead by adding, in header information, a global motion vector of the reference picture, and coding a motion vector for a coding target picture using the scaled global motion vector.

More specifically, when a co-located block use prohibition flag is on, a global motion vector read from the global vector storing unit 116 is added in motion vector predictor candidates for the coding target block and assigned to header information of a picture header or the like. Thus, even if a reference picture is lost in decoding, it is possible to decode the bitstream without being affected by the decoding error, and to thereby reduce error propagation.

In addition, when a co-located block use prohibition flag is off, it is possible to select the reference motion vector optimum for the coding target block according to a co-located reference block direction flag, which makes it possible to increase the compression efficiency. Particularly when a co-located block is a forward reference block, it is possible to reduce a prediction difference using a backward reference motion vector. A backward reference motion vector is a motion vector located in a direction from a picture including the co-located block to the coding target block and thus has a high possibility of becoming closer to the optimum motion vector. Therefore, the use of the backward reference motion vector reduces the prediction difference.

On the other hand, a forward reference motion vector is a motion vector located in the direction opposite to the direction from a picture including the co-located block to the coding target block and thus has a low possibility of becoming closer to the optimum motion vector. Therefore, the use of the forward reference motion vector increases the prediction difference. In addition, also in the case where a co-located block is a backward reference block, it is possible to yield a reduced prediction difference using a forward reference motion vector having a high possibility of becoming closer to the optimum motion vector.

In Embodiment 1, when the co-located block has two or more motion vectors, a switch is made between the motion vectors used for the co-located block to be used for calculating a temporal motion vector predictor for the coding target block, depending on whether the co-located block is a backward reference block or a forward reference block. However, this is a non-limiting example.

For example, it is also possible to calculate a temporal motion vector predictor using a motion vector which refers to the reference picture temporally closest to the picture including the co-located block (the motion vector is a motion vector having a shortest temporal distance). Here, it is conceivable that the temporal distance is determined depending on the number of pictures between the picture including the co-located block and the reference picture referred to by the co-located block in display time order.

In Embodiment 1, when the co-located block has two or more motion vectors, a switch is made between the motion vectors used for the co-located block to be used for calculating a temporal motion vector predictor for the coding target block, depending on whether the co-located block is the backward reference block or the forward reference block. However, this is a non-limiting example. For example, it is also possible to calculate a temporal motion vector predictor using the smaller one of the two motion vectors for the co-located block. Here, the magnitude of a motion vector means an absolute value or the like of a motion vector.

In Embodiment 1, when the co-located block use prohibition flag is on, the global motion vector read from the global vector storing unit 116 is added, as a replacement vector for a temporal motion vector predictor, to the motion vector predictor candidates. However, this is a non-limiting example. For example, it is also good to always determine the value of the global motion vector to be 0 and add the global motion vector to motion vector predictor candidates (specifically, add the motion vector having a motion quantity of 0 as the replacement vector to the motion vector predictor candidates). In this case, there is no need to assign header information or the like the global motion vector. In addition, when the co-located block use prohibition flag is on, it is also good to always skip adding the temporal motion vector predictor in the motion vector predictor candidates. Such skipping of inclusion of the temporal motion vector predictor in the motion vector predictor candidates makes it possible to increase the coding efficiency.

In Embodiment 1, such a co-located block use prohibition flag may be assigned to only particular pictures instead of being assigned to each of all the pictures. Examples of conceivable structures include a structure in which a co-located block use prohibition flag is assigned only to each of pictures which are referred to by other pictures (P-pictures, B-pictures which are referred to by other pictures, and pictures belonging to the lowermost level layer in a reference structure composed of a plurality of layers) and no co-located block use prohibition flag is assigned to each of pictures which are not referred to by other pictures. As described above, it is possible to reduce decoding error propagation while increasing the coding efficiency by assigning the co-located block use prohibition flag to only each of the particular pictures.

Although Embodiment 1 relates to the structure in which a co-located block use prohibition flag is assigned for each picture, it is also good to assign such a co-located block use prohibition flag for each slice composed of a plurality of blocks. Assignment of a co-located block use prohibition flag for each slice makes it possible to increase the global vector prediction accuracy.

Although a co-located block use prohibition flag is assigned for each of the pictures in Embodiment 1, it is possible that no co-located block use prohibition flag is assigned and no temporal motion vector predictor is added to motion vector predictor candidates, based on a picture type, without assigning any co-located block use prohibition flag. For example, it is conceivable that a global vector predictor may be added to motion vector predictor candidates without adding any temporal motion vector predictor to motion vector predictor candidates for each of pictures which are referred to by other pictures (P-pictures, B-pictures which are referred to by other pictures, and pictures belonging to the lowermost level layer in a reference structure composed of a plurality of layers). In this way, it is possible to omit such a co-located block use prohibition flag by determining whether or not to add the temporal motion vector predictor to the motion vector predictor candidates, based on the picture type. Therefore, it is possible to increase the coding efficiency.

Embodiment 2

Figure 12:
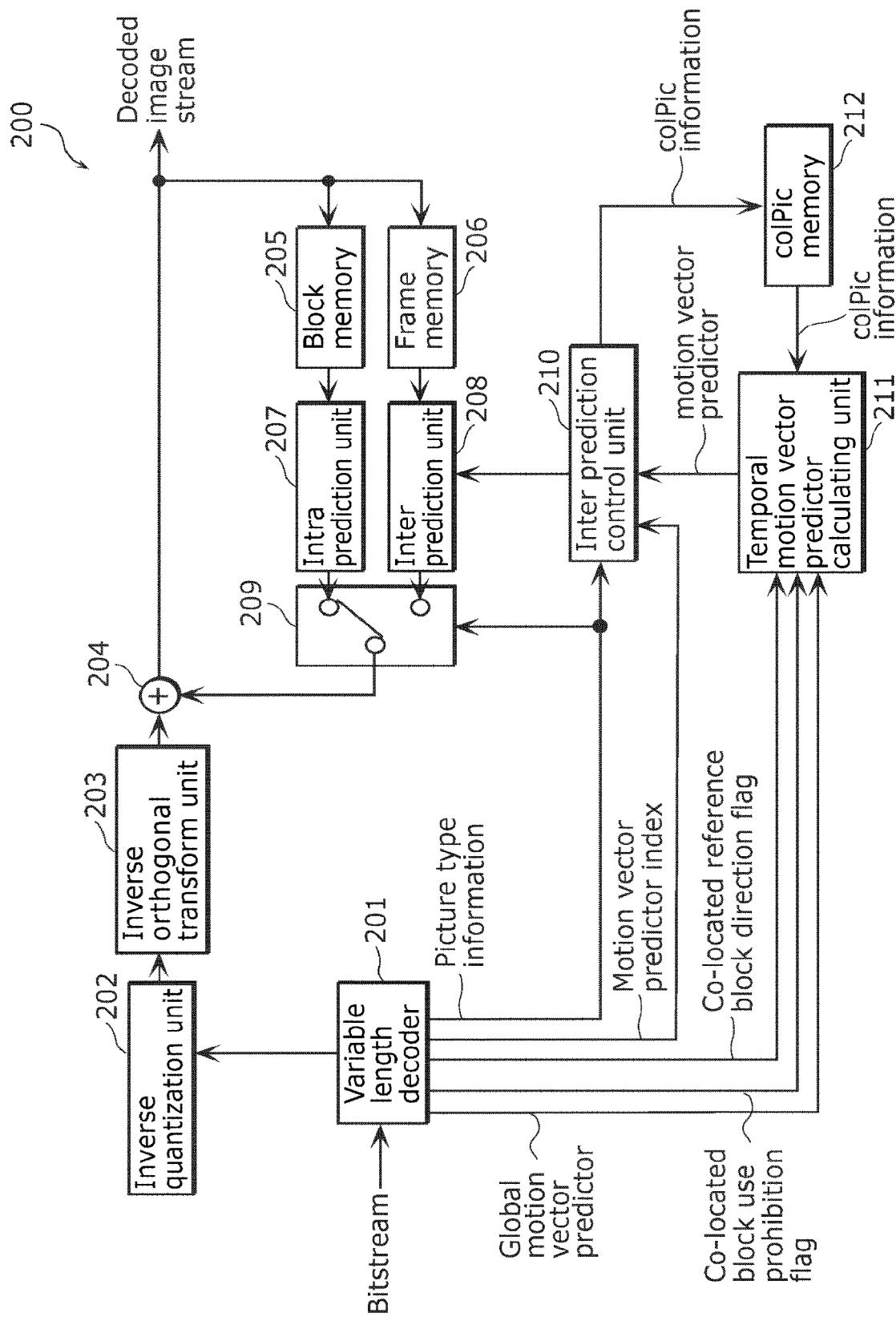
FIG. 12 is a block diagram of a moving picture decoding apparatus according to Embodiment 2.

FIG. 12 is a block diagram of a structure of a moving picture decoding apparatus 200 using a moving picture decoding method according to Embodiment 2.

In Embodiment 2, a block included in a picture located forward of a decoding target picture in display time order is referred to as a forward reference block (the picture is a reference picture identified in a reference picture list L0). In addition, a block included in a picture located backward of the decoding target picture in display time order is referred to as a backward reference block (the picture is a reference picture identified in a reference picture list L1).

As shown in FIG. 12, the moving picture decoding apparatus 200 includes: a variable length decoder 201, an inverse quantization unit 202, an inverse orthogonal transform unit 203, an adder 204, a block memory 205, a frame memory 206, an intra prediction unit 207, an inter prediction unit 208, a switch 209, an inter prediction control unit 210, a temporal motion vector predictor calculating unit 211, and a colPic memory 212.

The variable length decoder 201: performs variable length decoding on an input bitstream; outputs picture type information to the switch 209 and the inter prediction control unit 210; outputs a motion vector predictor index to the inter prediction control unit 210; outputs a co-located block use prohibition flag and a co-located reference block direction flag, and a global motion vector to the temporal motion vector predictor calculating unit 211; and outputs quantized coefficients to the inverse quantization unit 202.

The inverse quantization unit 202 performs inverse quantization on the quantized coefficients obtained from the variable length decoder 201 to reconstruct transform coefficients, and outputs the reconstructed transform coefficients to the inverse orthogonal transform unit 203. The inverse orthogonal transform unit 203 transforms the reconstructed transform coefficients obtained from the inverse quantization unit 202 from a frequency domain to an image domain to reconstruct residual blocks, and outputs the reconstructed residual blocks to the adder 204.

The adder 204 adds the residual blocks obtained from the inverse orthogonal transform unit 203 and prediction blocks obtained from the switch 209 to reconstruct decoded blocks. Next, the adder 204 outputs a decoded image stream including the reconstructed decoded blocks to outside of the apparatus, and stores the decoded image stream in the block memory 205 and the frame memory 206.

The block memory 205 stores, on a block-by-block basis, the decoded image stream obtained from the adder 204. The frame memory 206 stores, on a frame-by-frame basis, the decoded image stream obtained from the adder 204.

The intra prediction unit 207 performs intra prediction using a block-based decoded image stream stored in the block memory 205 to generate a prediction block for each decoding target block, and outputs the prediction block to the switch 209. The inter prediction unit 208 performs inter prediction using a frame-based decoded image stream stored in the frame memory 206 to generate a prediction block for each decoding target block, and outputs the prediction block to the switch 209. The switch 209 outputs, to the adder 204, the prediction block generated by the intra prediction unit 207 and the prediction block generated by the inter prediction unit 208.

When a co-located block use prohibition flag obtained from the variable length decoder 201 is off, the temporal motion vector predictor calculating unit 211 derives a motion vector predictor candidate (temporal motion vector predictor) in the temporal motion vector predictor mode, using colPic information such as a motion vector in a co-located block stored in the colPic memory 212. On the other hand, when the co-located block use prohibition flag is on, the temporal motion vector predictor calculating unit 211 adds the global motion vector obtained from the variable length decoder 201 to motion vector predictor candidates.

In addition, the temporal motion vector predictor calculating unit 211 assigns the motion vector predictor added to the candidates a motion vector predictor index. Next, the temporal motion vector predictor calculating unit 211 outputs the motion vector predictor and the motion vector predictor index to the inter prediction control unit 210.

In addition, when the co-located block does not have any motion vector, the temporal motion vector predictor calculating unit 211 may stop motion vector derivation in the temporal motion vector predictor mode or add a motion vector having a motion quantity of 0 to motion vector predictor candidates.

The inter prediction control unit 210 determines a motion vector predictor corresponding to the motion vector predictor index obtained from the variable length decoder 201 from among a plurality of motion vector predictor candidates. Next, the inter prediction control unit 210 adds the determined motion vector predictor and information indicating difference between the motion vector and the motion vector predictor to derive a motion vector for use in inter prediction. In addition, the inter prediction control unit 210 stores, in the colPic memory 212, colPic information including a motion vector etc. for the decoding target block.

Figure 13:
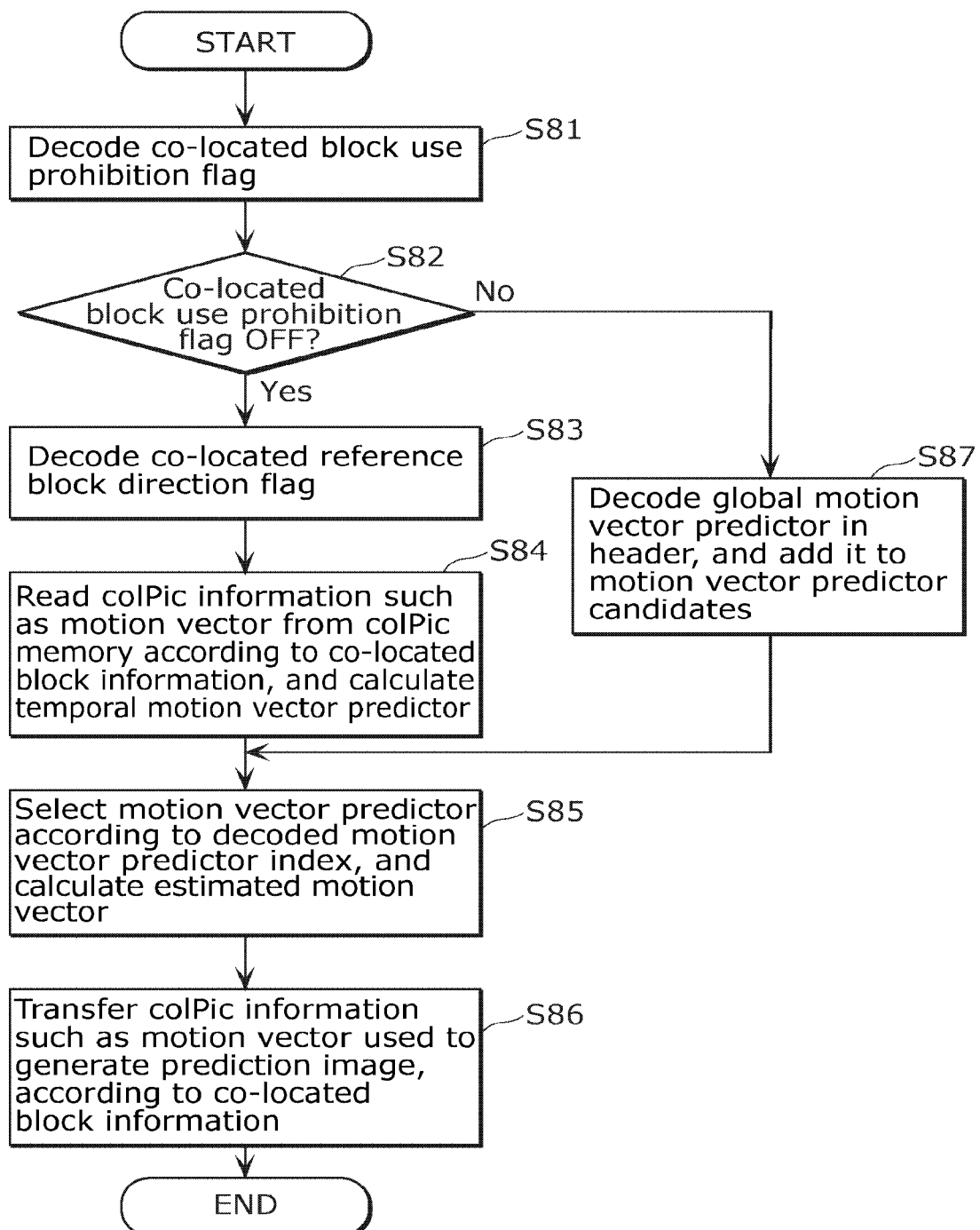
FIG. 13 is a diagram showing a schematic flow of processes in a moving picture decoding method according to Embodiment 2.

FIG. 13 is an outline of a processing flow of a moving picture decoding method according to Embodiment 2.

First, the variable length decoder 201 decodes the co-located block use prohibition flag for each picture (S81). Next, the variable length decoder 201 determines whether or not the co-located block use prohibition flag is off (S82). When the co-located block use prohibition flag is off (Yes in S82), the variable length decoder 201 decodes the co-located reference block direction flag for the picture (S83). The variable length decoder 201 then outputs the decoded co-located block use prohibition flag and co-located reference block direction flag to the temporal motion vector predictor calculating unit 211.

Next, in the same manner as in FIG. 8, the temporal motion vector predictor calculating unit 211 reads colPic information including a reference motion vector etc. in the co-located block from the colPic memory 212 according to co-located block information, and adds a temporal motion vector predictor generated using the reference motion vector in the co-located block to motion vector predictor candidates (S84).

On the other hand, when the co-located block use prohibition flag is on, the temporal motion vector predictor calculating unit 211 obtains a global motion vector stored in header information such as a picture header from the variable length decoder 201, and adds the global motion vector to the motion vector predictor candidates (S87).

Next, the inter prediction control unit 210 determines a motion vector predictor corresponding to the decoded motion vector predictor index from among the plurality of motion vector predictor candidates (S85). In addition, the inter prediction control unit 210 adds the determined motion vector predictor and the prediction difference information to derive a motion vector and outputs the motion vector to the inter prediction unit 208. Next, the inter prediction unit 208 generates a prediction block for the decoding target block using the derived motion vector in inter prediction.

Next, the inter prediction control unit 210 stores, in the colPic memory 212, colPic information including a motion vector etc. used in inter prediction (S86). The colPic memory 212 stores a motion vector in a reference picture, an index value of the reference picture, a prediction direction etc. for calculation of a temporal motion vector predictor for a decoding target block.

The reference motion vector selecting method performed to calculate a temporal motion vector predictor when a reference block has two or more reference motion vectors is based on a co-located block use prohibition flag. However, it is to be noted that the method is a non-limiting example. For example, it is also good to calculate temporal distances of reference motion vectors and use the one of the reference motion vectors which has the shortest temporal distance. Here, a temporal distance is calculated based on the number of pictures between the reference picture including a reference block and a picture which is referred to by the reference picture in display order. In addition, for example, it is also good to calculate the magnitudes of reference motion vectors and determine, to be a temporal motion vector predictor, the one of the motion vectors which has been derived using a small reference motion vector.

FIG. 14 shows examples of syntax of a bitstream in the moving picture decoding method according to Embodiment 2. In FIG. 14, forbid_collocated_flag denotes a co-located block use prohibition flag, tmv_x denotes a horizontal component of a global motion vector predictor, tmv_y denotes a vertical component of the global motion vector predictor, and collocated_from_l0_flag denotes a co-located reference block direction flag.

As shown in FIG. 14, when the forbid_collocated_flag denoting the co-located block use prohibition flag is 1, the global motion vector predictors tmv_x and tmv_y are assigned to the bitstream and are added to motion vector predictor candidates.

In addition, when the forbid_collocated_flag denoting the co-located block use prohibition flag is 0, the collocated_from_l0_flag is assigned to the bitstream. In addition, a co-located block is determined according to the co-located reference block direction flag, and a temporal motion vector predictor is calculated using the reference motion vector in the co-located block. Here, a collocated_from_l0_flag of 1 shows that a co-located block is a forward co-located block and a collocated_from_l0_flag of 0 shows that a co-located block is a backward co-located block. However, this is a non-limiting example.

In Embodiment 2, when the co-located block use prohibition flag is on, the global motion vector decoded from the header information or the like is used. However, it is also good to always determine the value of a global motion vector predictor to be 0 in conformity with the coding method and add the global motion vector to motion vector predictor candidates. In this case, the global motion vector is not assigned to the header information or the like, and thus the decoding process is omitted. In addition, when the co-located block use prohibition flag is on, it is also good to always skip adding the temporal motion vector predictor to the motion vector predictor candidates.

As described above, in Embodiments 1 and 2, the temporal motion vector predictor mode using a motion vector for a current coding unit in a reference picture is turned off at constant intervals, and instead a global motion vector of the reference picture is assigned to header information. Using this header information, a motion vector for the coding target picture is coded, which makes it possible to appropriately decode a bitstream with reduced decoding error propagation while suppressing decrease in coding efficiency.

More specifically, when a co-located block use prohibition flag is on, the global vector read from the global vector storing unit 116 is added to the motion vector predictor candidates for the coding target block and is assigned to the header information such as the picture header etc. With this, even if a reference picture is lost in decoding, it is possible to decode the bitstream without being affected by the decoding error, and to thereby generate the bitstream with reduced error.

In addition, when a co-located block use prohibition flag is off, it is possible to appropriately decode the bitstream for which the reference motion vector optimum for the coding target block has been selected according to a co-located reference block direction flag.

Although the global vector read from the global vector storing unit 116 is used when the co-located block use prohibition flag is on in Embodiments 1 and 2, it is also good to always determine the value of a global motion vector to be 0 and add the global motion vector to motion vector predictor candidates. In addition, when the co-located block use prohibition flag is on, it is also good to always skip adding the temporal motion vector predictor to the motion vector predictor candidates. With this structure, it becomes possible to reduce the processing load for decoding.

In addition, although the co-located block use prohibition flags are decoded from all the pictures in Embodiment 2, it is also good to decode some co-located block use prohibition flags only from some particular pictures. For example, co-located block use prohibition flags are decoded from only pictures which are referred to by other pictures (P-pictures, B-pictures which are referred to by other pictures, and pictures belonging to the lowermost level layer in a reference structure composed of a plurality of layers) and no co-located block use prohibition flag is decoded from pictures which are not referred to by other pictures. In this way, it is possible to reduce decoding error propagation while reducing the processing load for decoding, by decoding some co-located block use prohibition flags from only particular pictures.

Although Embodiment 2 relates to the structure in which a co-located block use prohibition flag is decoded for each picture, it is also good to decode such a co-located block use prohibition flag for each slice composed of a plurality of blocks. Decoding of a co-located block use prohibition flag for each slice makes it possible to increase the global vector prediction accuracy.

Although a co-located block use prohibition flag is decoded from each of all the pictures in Embodiment 2, it is possible that no temporal motion vector predictor is added to motion vector predictor candidates, based on a picture type. For example, it is conceivable that a global vector is added to motion vector predictor candidates without adding any temporal motion vector predictor to the motion vector predictor candidates for each of pictures which are referred to by other pictures (P-pictures, B-pictures which are referred to by other pictures, and pictures belonging to the lowermost level layer in a reference structure composed of a plurality of layers). In this way, it is possible to increase the coding efficiency while reducing the processing load for decoding by determining whether to add a temporal motion vector predictor or a global motion vector to motion vector predictor candidates, based on a picture type.

(Variation)

Figure 15:
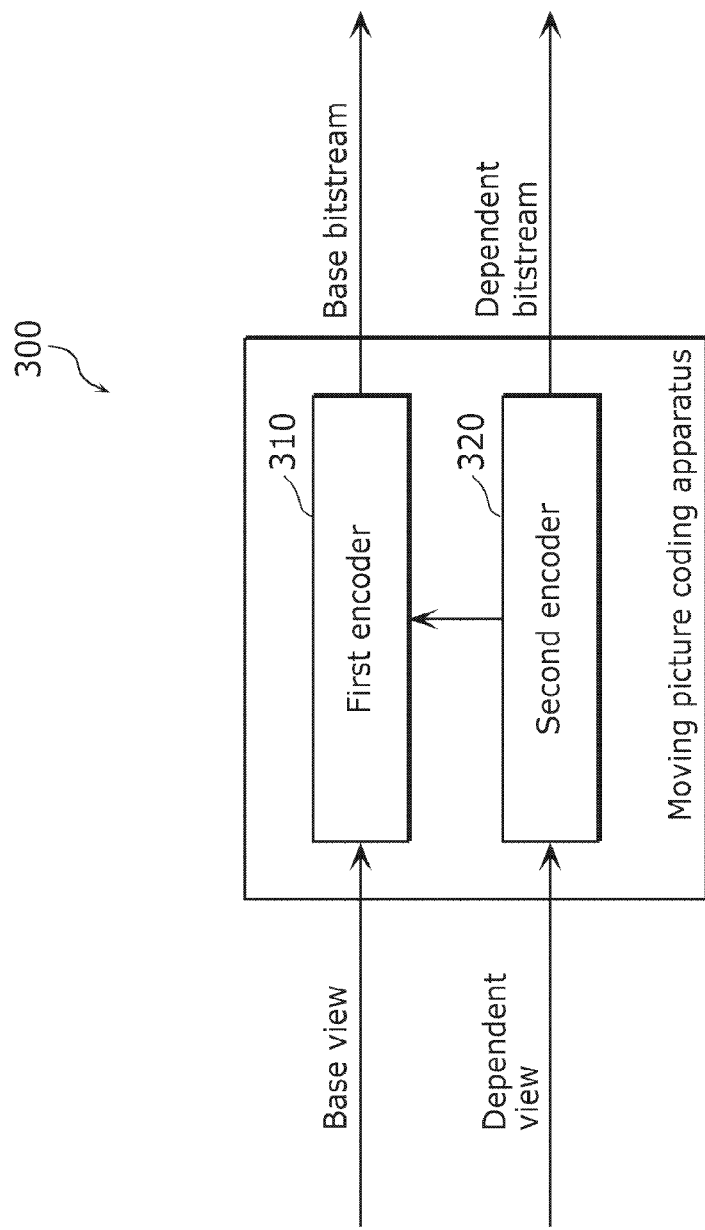
FIG. 15 is a block diagram of a moving picture coding apparatus according to Variation of Embodiment 1.

Next, a moving picture coding apparatus according to Variation of Embodiment 1 is described with reference to FIG. 15. FIG. 15 is a block diagram of a moving picture coding apparatus 300 according to Variation of Embodiment 1. The differences from Embodiment 1 are mainly described below without repeating the same descriptions of the common points as in Embodiment 1.

As shown in FIG. 15, the moving picture coding apparatus 300 includes a first encoder 310 which codes a base view and outputs a resulting base bitstream and a second encoder 320 which codes a dependent view and output a resulting dependent bitstream. In the non-limiting example shown in FIG. 15, the base bitstream and the dependent bitstream are output independently of each other. However, it is also good to output a single bitstream in which a base bitstream and a dependent bitstream are combined.

The first and second encoders 310 and 320 have basically the same structure as the equivalents in the moving picture coding apparatus 100 shown in FIG. 1. However, the second encoder 320 can refer to a frame memory 108 etc. of the first encoder 310, in addition to the reference destinations in the structure in FIG. 1.

Figure 16:
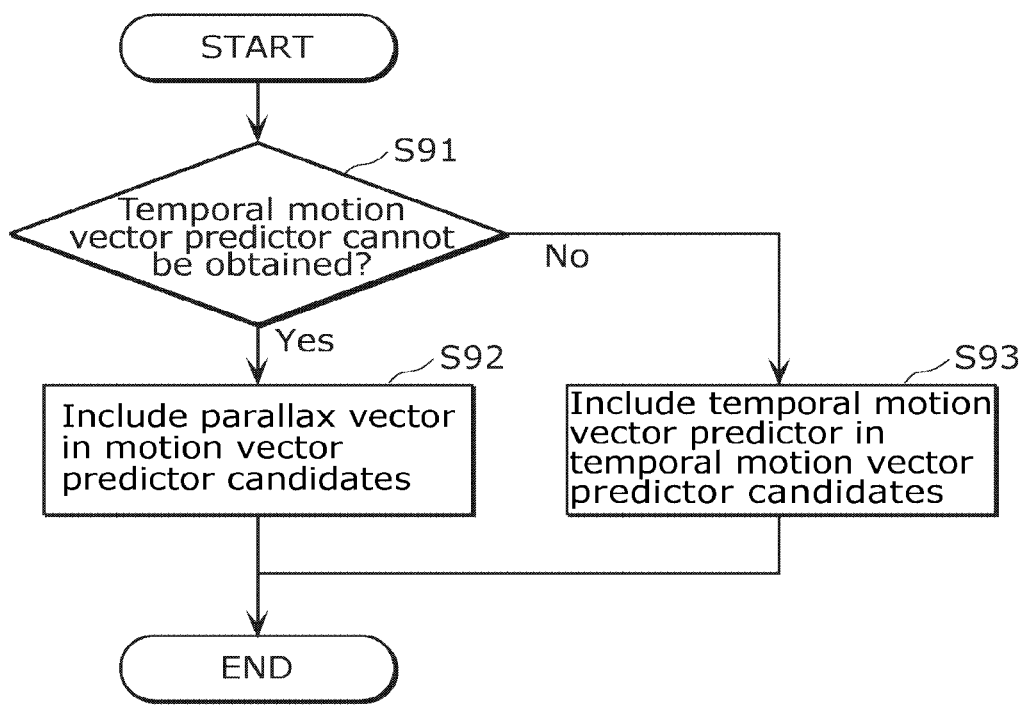
FIG. 16 is a flowchart of operations in a moving picture coding method according to Variation of Embodiment 1.
Figure 17:
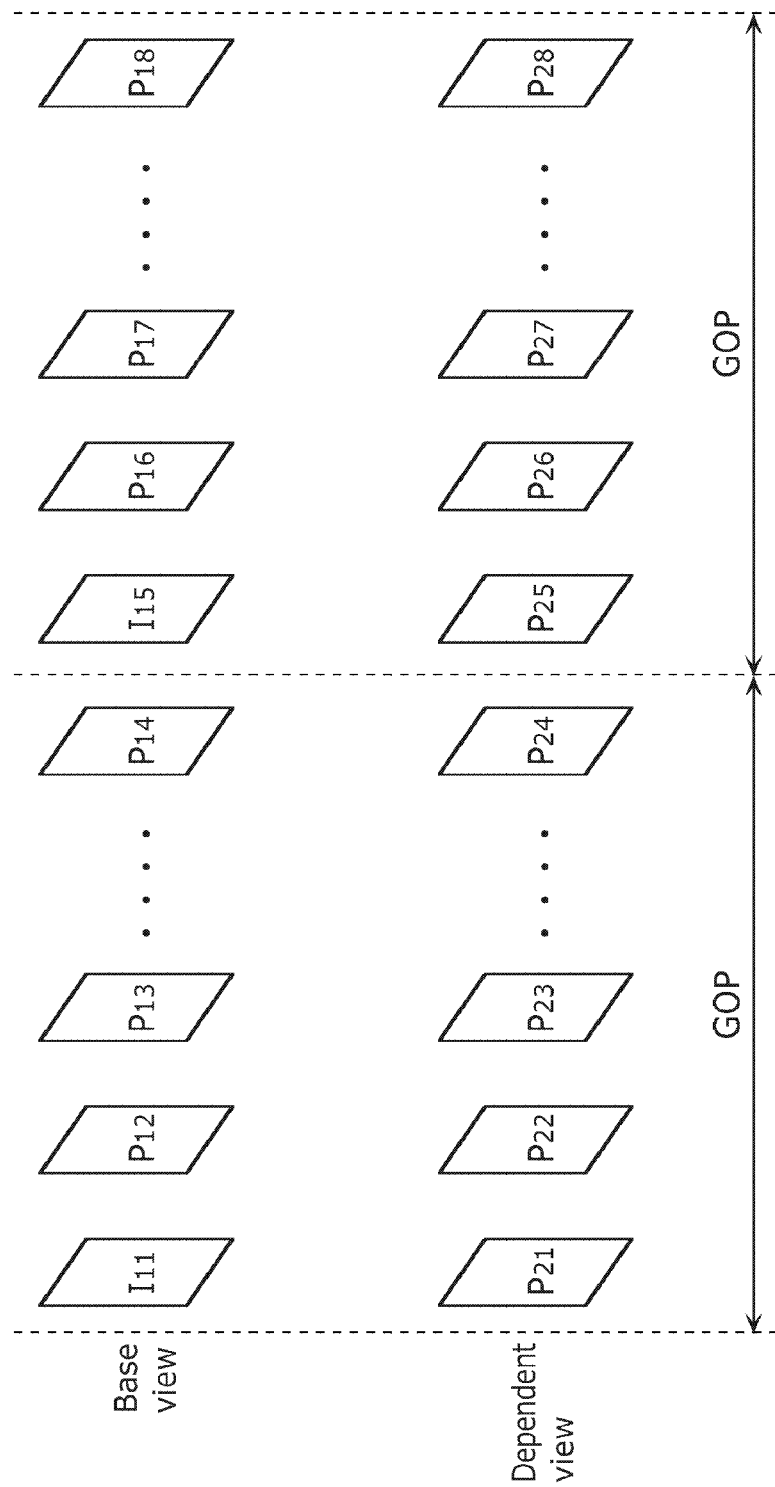
FIG. 17 is a diagram showing pictures in a base view and pictures in a dependent view.

Next, a moving picture coding method according to Variation of Embodiment 1 is described with reference to FIGS. 16 and 17. FIG. 16 is a flowchart of operations in the moving picture coding method according to Variation of Embodiment 1. FIG. 17 is a diagram showing pictures in a base view and pictures in a dependent view.

As shown in FIG. 17, the base view includes a plurality of pictures I11, P12, P13, P14, I15, P16, and P17. In addition, among the pictures in the base view, each of the starting pictures I11 and I15 in Groups Of Pictures (GOPs) is an I-picture, and the other pictures P12, P13, P14, P16, and P17 are P-pictures. It is to be noted that the base view is coded with reference to only pictures in the base view (in other words, using intra prediction coding or inter prediction coding), and is decoded.

As shown in FIG. 17, the dependent view includes a plurality of pictures P21, P22, P23, P24, P25, P26, and P27. All of the pictures P21, P22, P23, P24, P25, P26, and P27 in the dependent view are P-pictures. It is to be noted that the dependent view is coded with reference to pictures in the dependent view and corresponding pictures in the base view (in other words, using inter-view prediction coding), and is decoded.

In addition, the base view and the dependent view are videos of a subject when viewed from different viewpoints. In other words, each of pairs of mutually-corresponding pictures in the base view and the dependent view (having the same time stamp) has parallax in a horizontal direction. The second encoder 320 can code each of the pictures in the dependent view, using a corresponding image in the base view as a reference picture. Hereinafter, with reference to FIG. 16, a description is given of operations performed by the temporal motion vector predictor calculating unit 114 of the second encoder 320.

First, the temporal motion vector predictor calculating unit 114 determines whether or not it is impossible to obtain a temporal motion vector predictor at the time of coding a coding target block (S91). When it is impossible to obtain any temporal motion vector predictor (Yes in S91), the temporal motion vector predictor calculating unit 114 includes a later-described parallax vector to motion vector predictor candidates (S92). On the other hand, when it is possible to obtain any temporal motion vector predictor (No in S91), the temporal motion vector predictor calculating unit 114 includes a temporal motion vector predictor to the motion vector predictor candidates (S93).

Here, exemplary cases in which no temporal motion vector predictor can be obtained includes a case where a coding target block is included in one of the starting pictures P21 and P25 in the GOPs. There are no pictures located forward of the starting pictures P21 and P25 in the GOPs in display time order and to be referred to by the starting pictures P21 and P25. In other words, when the coding order and the display order match, the pictures P21 and P25 can refer to only the corresponding pictures I11 and I15 in the base view, respectively.

However, the pictures I11 and I15 are I-pictures, and thus do not have any motion vector information. In view of this, in such a case, the temporal motion vector predictor calculating unit 114 includes, as a replacement vector for a temporal motion vector predictor, a parallax vector stored in the global vector storing unit 116 in motion vector predictor candidates, and includes a parallax vector in header information of the dependent bitstream.

Here, the parallax vector is a vector corresponding to parallax between the base view and the dependent view. More specifically, the inter prediction control unit 112 of the second encoder 320 outputs, to the global vector storing unit 116, a motion vector at the time of performing inter-view prediction coding on each of the blocks of the coding target picture in the dependent view (in other words, the motion vector is a motion vector at the time of coding the corresponding picture in the base view as a reference picture). The global vector storing unit 116 stores, as the parallax vector, an average value, a median value, a mode value, or the like of motion vectors for each picture obtained from the inter prediction control unit 112.

In Step S92 of FIG. 16, the temporal motion vector predictor calculating unit 114 may select, as the parallax vector for the picture P25 in the dependent view, (i) the parallax vector (whose reference picture is the picture I11) calculated at the starting picture P21 in the GOP immediately before the GOP including the picture P25 or (ii) the parallax vector (whose reference picture is the picture P14) calculated at the picture P24 coded immediately before.

The above specific case where no temporal motion vector predictor can be obtained in Step S91 of FIG. 16 is a non-limiting example. As another example case, the co-located block use prohibition flag for a coding target picture may be on. The co-located block use prohibition flag is the same as in Embodiment 1, and thus the same description is not repeated here.

As described above, this embodiment can be applied to the case of coding the base view and the dependent view which constitute the multi-view video. In other words, it is possible to prevent decoding error propagation while suppressing decrease in coding efficiency by selectively including a temporal motion vector predictor or a parallax vector which is a replacement vector which replaces the temporal motion vector predictor, in motion vector predictor candidates.

Figure 18:
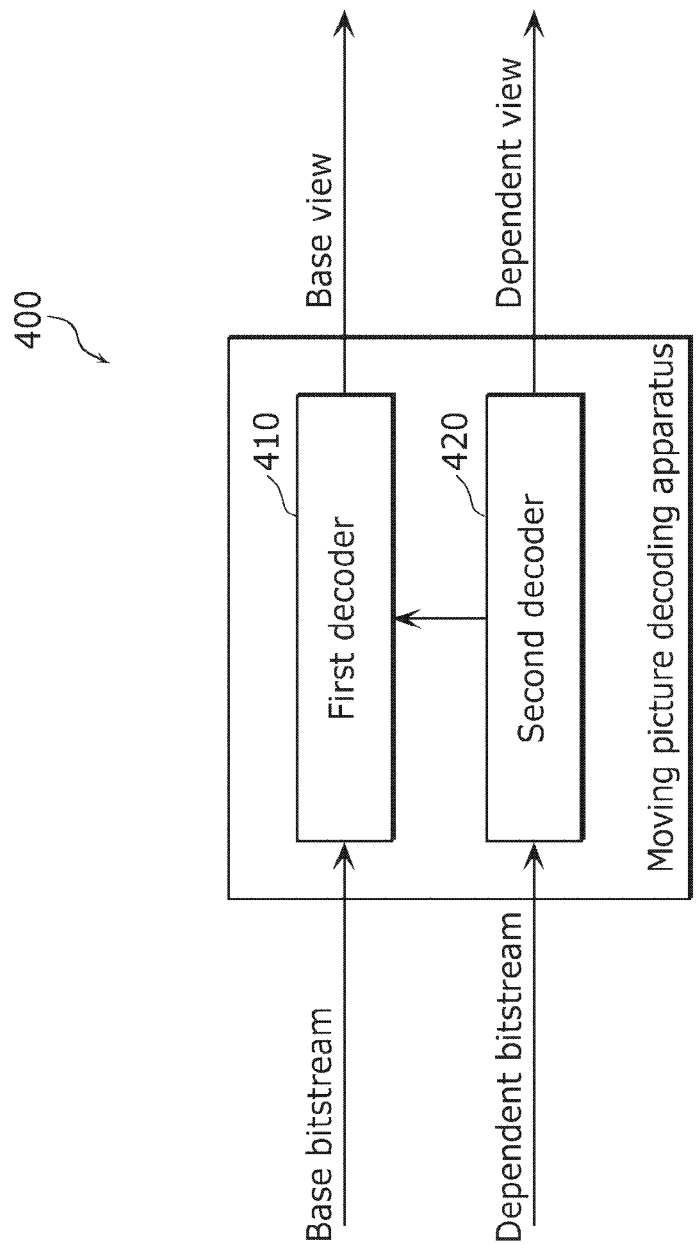
FIG. 18 is a block diagram of a moving picture decoding apparatus according to Variation of Embodiment 2.
Figure 19:
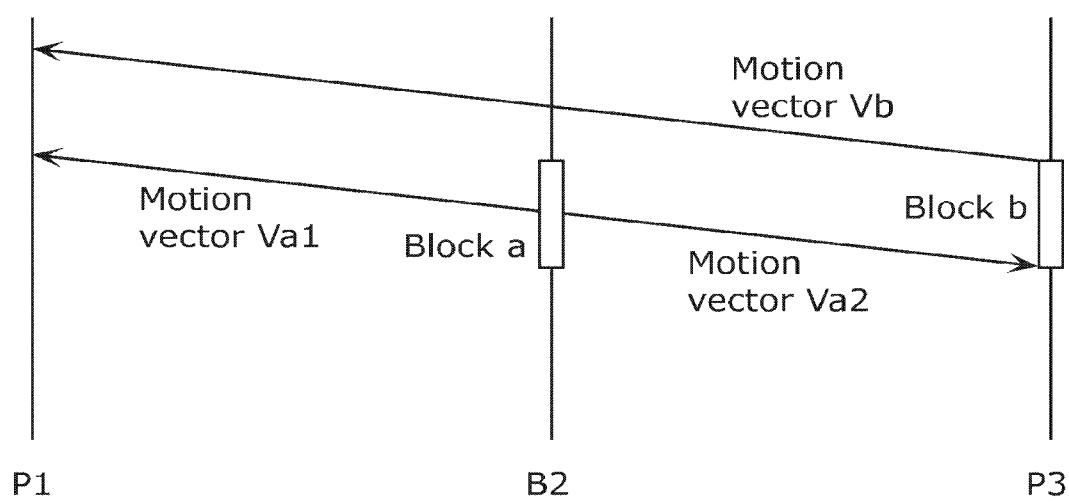
FIG. 19 is an illustration of motion vectors in a temporal motion vector predictor mode.

Next, a moving picture decoding apparatus 400 according to Variation of Embodiment 2 is described with reference to FIG. 18. FIG. 18 is a block diagram of a moving picture decoding apparatus 400 according to Variation of Embodiment 2. The differences from Embodiment 2 are mainly described below without repeating the same descriptions of the common points as in Embodiment 2.

As shown in FIG. 18, the moving picture decoding apparatus 400 includes a first decoder 410 which decodes a base bitstream and outputs the resulting base view and a second decoder 420 which decodes a dependent bitstream and outputs the resulting dependent view. In the non-limiting example shown in FIG. 18, the independent base bitstream and the dependent bitstream are input separately from each other. However, it is also good to input a single bitstream in which a base bitstream and a dependent bitstream are combined, and the bitstream is divided into the base bitstream and the dependent bitstream inside the moving picture decoding apparatus 400.

The first and second decoders 410 and 420 have basically the same structures as the equivalents in the moving picture decoding apparatus 200 shown in FIG. 12. However, the second decoder 420 can refer to a frame memory 206 etc. of the first decoder 410, in addition to the reference destinations in the structure in FIG. 12. In other words, the moving picture decoding apparatus 400 decodes the base bitstream and the dependent bitstream coded by the moving picture coding apparatus 300.

Next, the second decoder 420 of the moving picture decoding apparatus 400 can selectively include, as a vector predictor for a decoding target block, a temporal motion vector predictor stored in the colPic memory 212 or a parallax vector included in header information of the dependent bitstream.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software programs for realizing the moving picture coding method and the moving picture decoding method according to the embodiments are programs described below.

A program is for causing a computer to execute a moving picture coding method for performing inter prediction coding on a coding target block included in a coding target picture, the moving picture coding method including: coding the coding target block using a motion vector; generating a plurality of motion vector predictors; and coding the motion vector using one of the plurality of motion vector predictors generated in the generating, wherein, in the generating, a replacement vector which replaces a temporal motion vector predictor is included in the plurality of motion vector predictors when it is impossible to obtain the temporal motion vector predictor from a block which is included in a coded picture different from the coding target picture and corresponds to the coding target block, and in the generating, a motion vector having a motion quantity of 0 is included, as the replacement vector, in the plurality of motion vector predictors when obtainment of the temporal motion vector predictor from the coded picture is prohibited.

In addition, a program is for causing a computer to execute a moving picture decoding method for performing inter prediction decoding on a decoding target block included in a decoding target picture, the moving picture decoding method including: decoding the decoding target block using a motion vector; generating a plurality of motion vector predictors; and decoding the motion vector using one of the plurality of motion vector predictors generated in the generating, wherein, in the generating, a replacement vector which replaces a temporal motion vector predictor is included in the plurality of motion vector predictors when it is impossible to obtain the temporal motion vector predictor from a block which is included in a decoded picture different from the decoding target picture and corresponds to the decoding target block, and in the generating, a motion vector having a motion quantity of 0 is included, as the replacement vector, in the plurality of motion vector predictors when obtainment of the temporal motion vector predictor from the decoded picture is prohibited.

The herein disclosed subject matter is to be considered descriptive and illustrative only, and the appended Claims are of a scope intended to cover and encompass not only the particular embodiment(s) disclosed, but also equivalent structures, methods, and/or uses.

Embodiment 3

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 20:
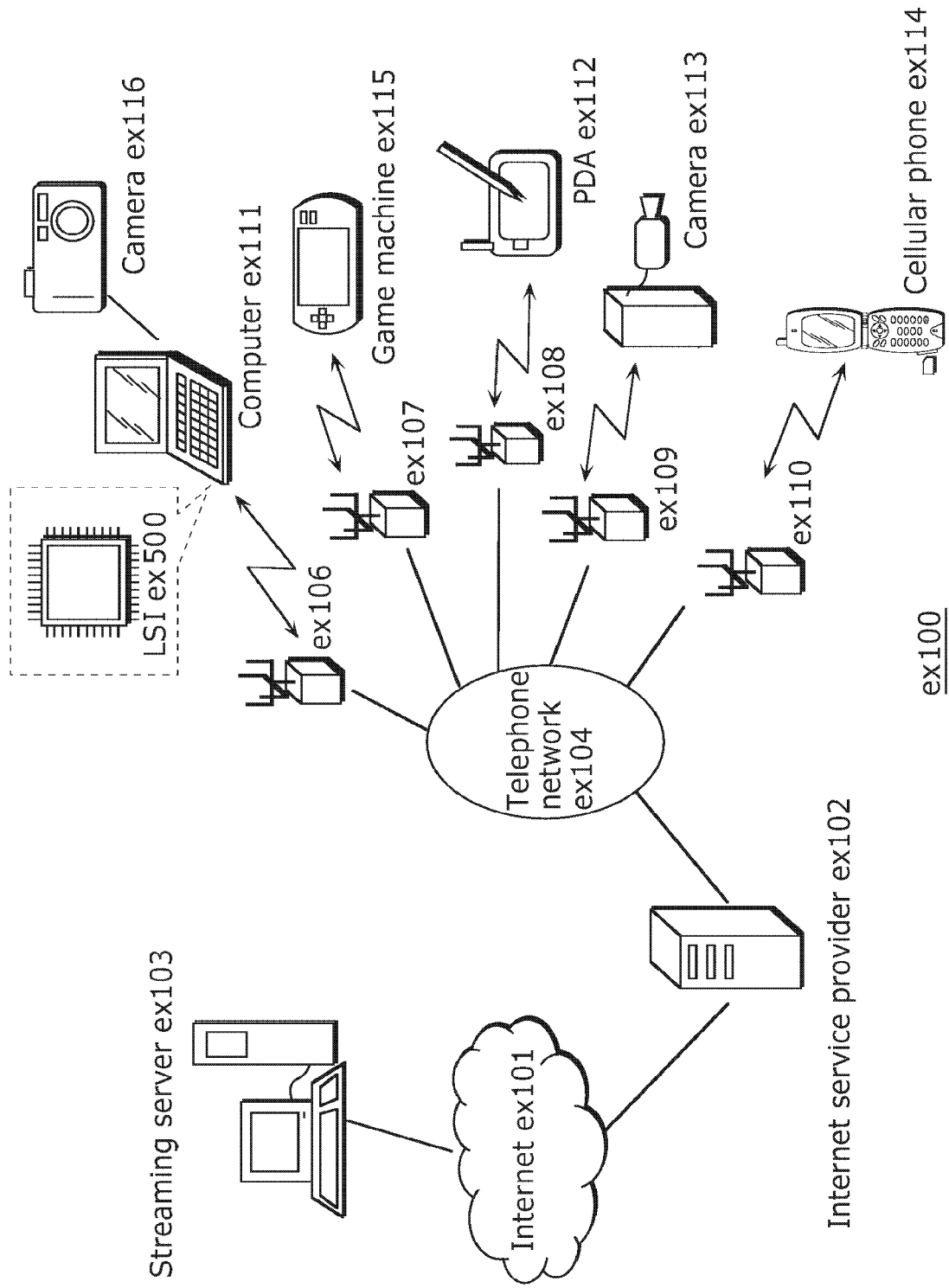
FIG. 20 shows an overall configuration of a content providing system for implementing content distribution services.

FIG. 20 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 20, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 21:
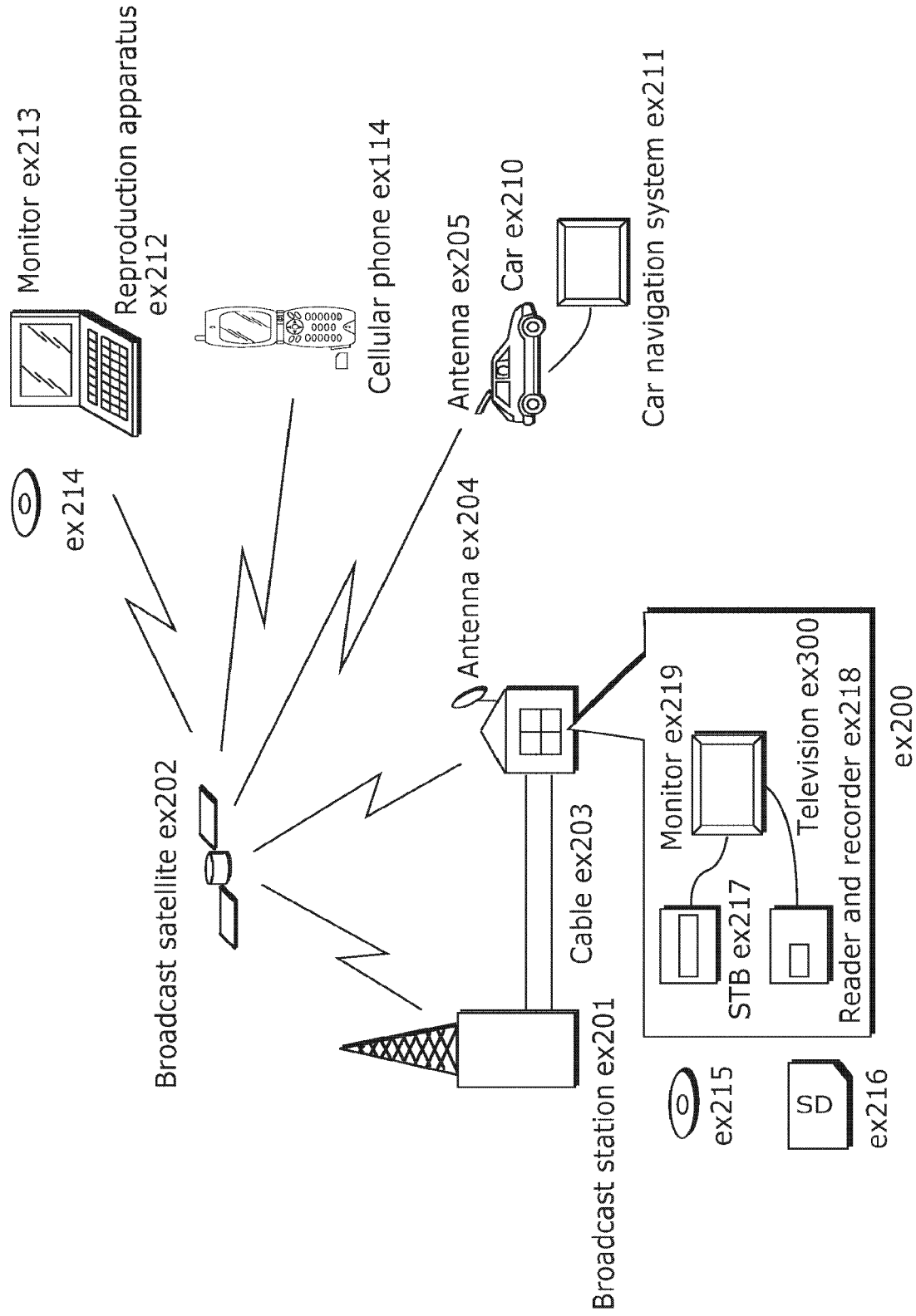
FIG. 21 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 21. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 22:
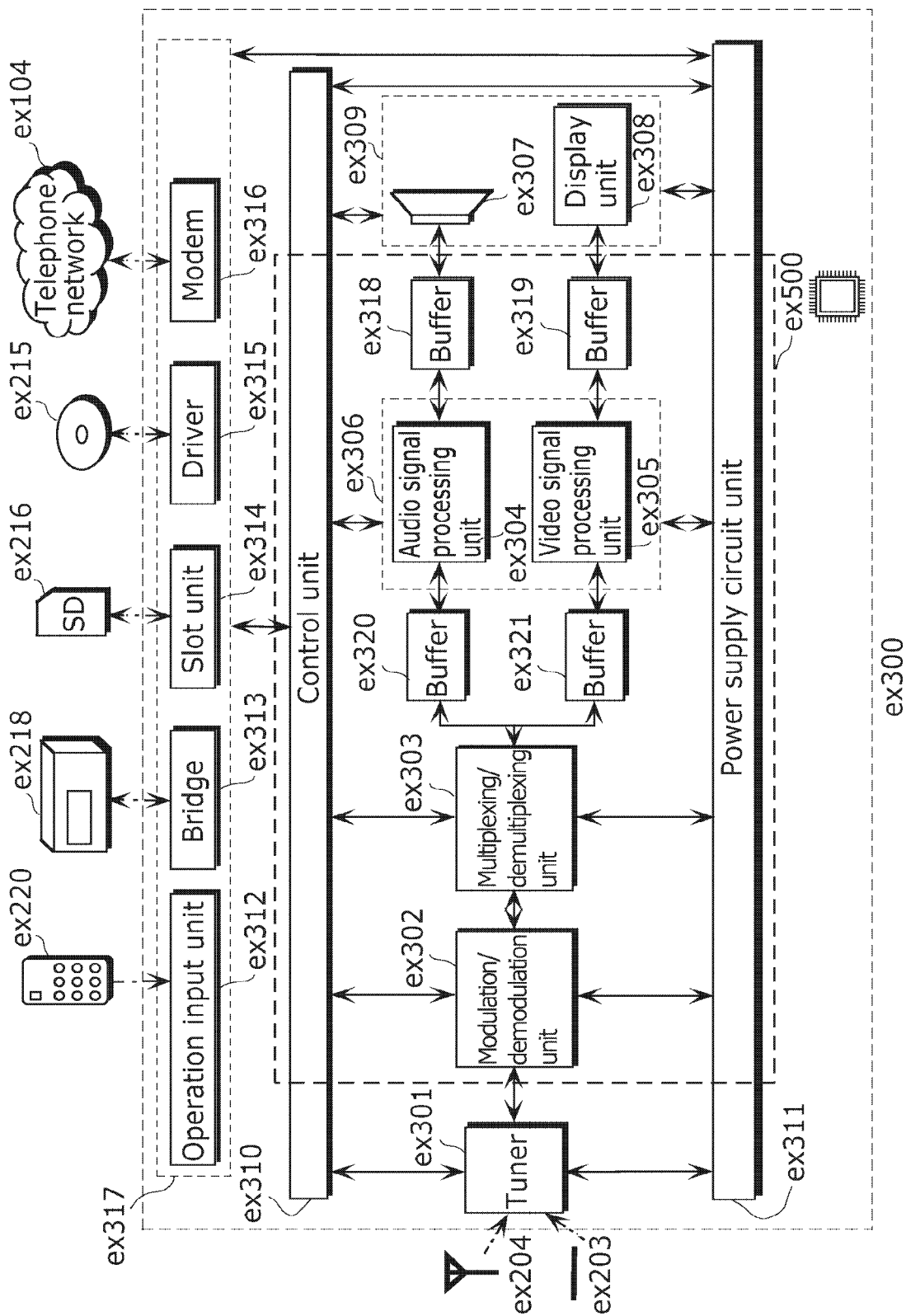
FIG. 22 shows a block diagram illustrating an example of a configuration of a television.

FIG. 22 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 23:
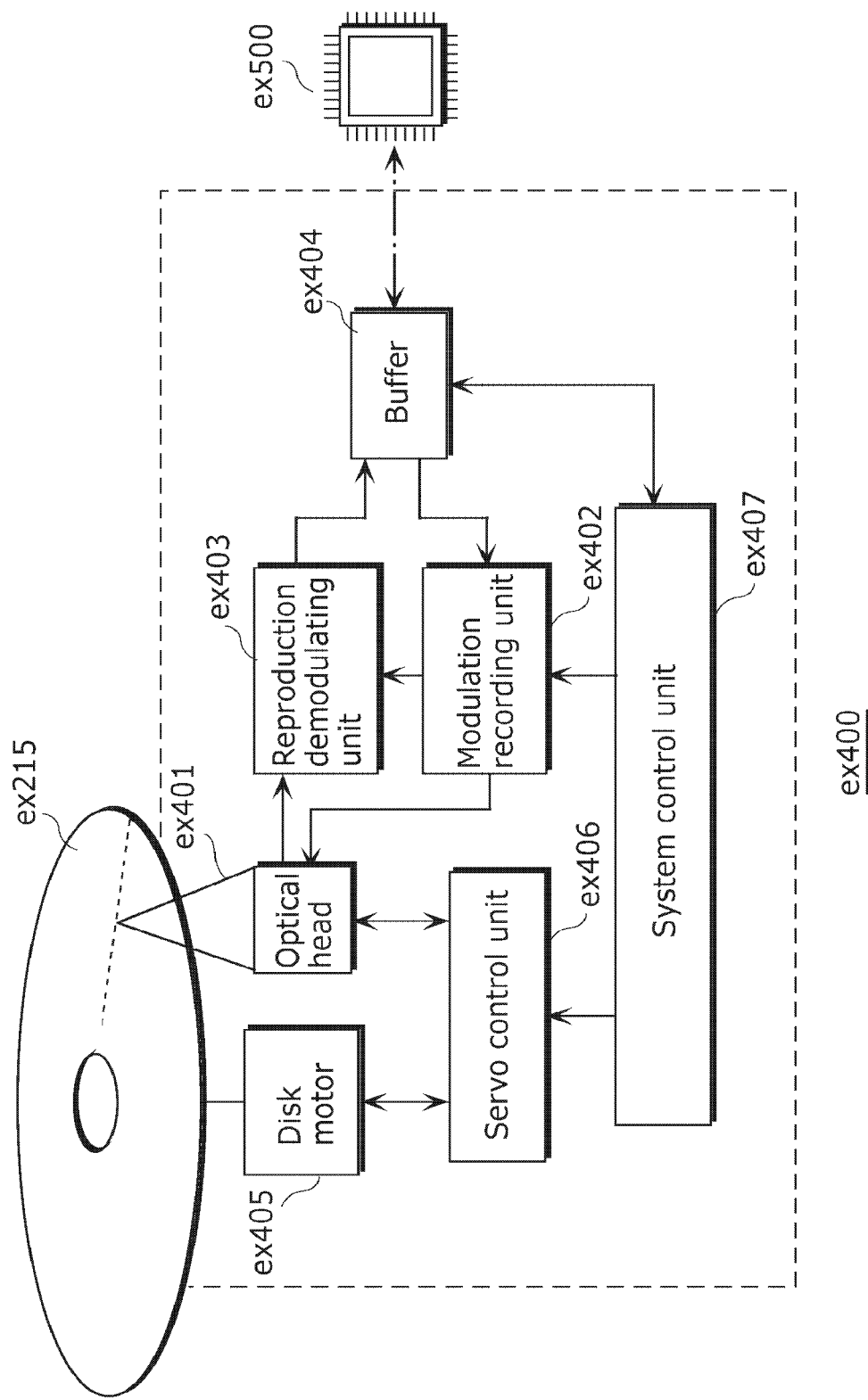
FIG. 23 shows a block diagram illustrating an example of a configuration of an information reproducing/recording unit that reads and writes information from and on a recording medium that is an optical disk.

As an example, FIG. 23 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 24:
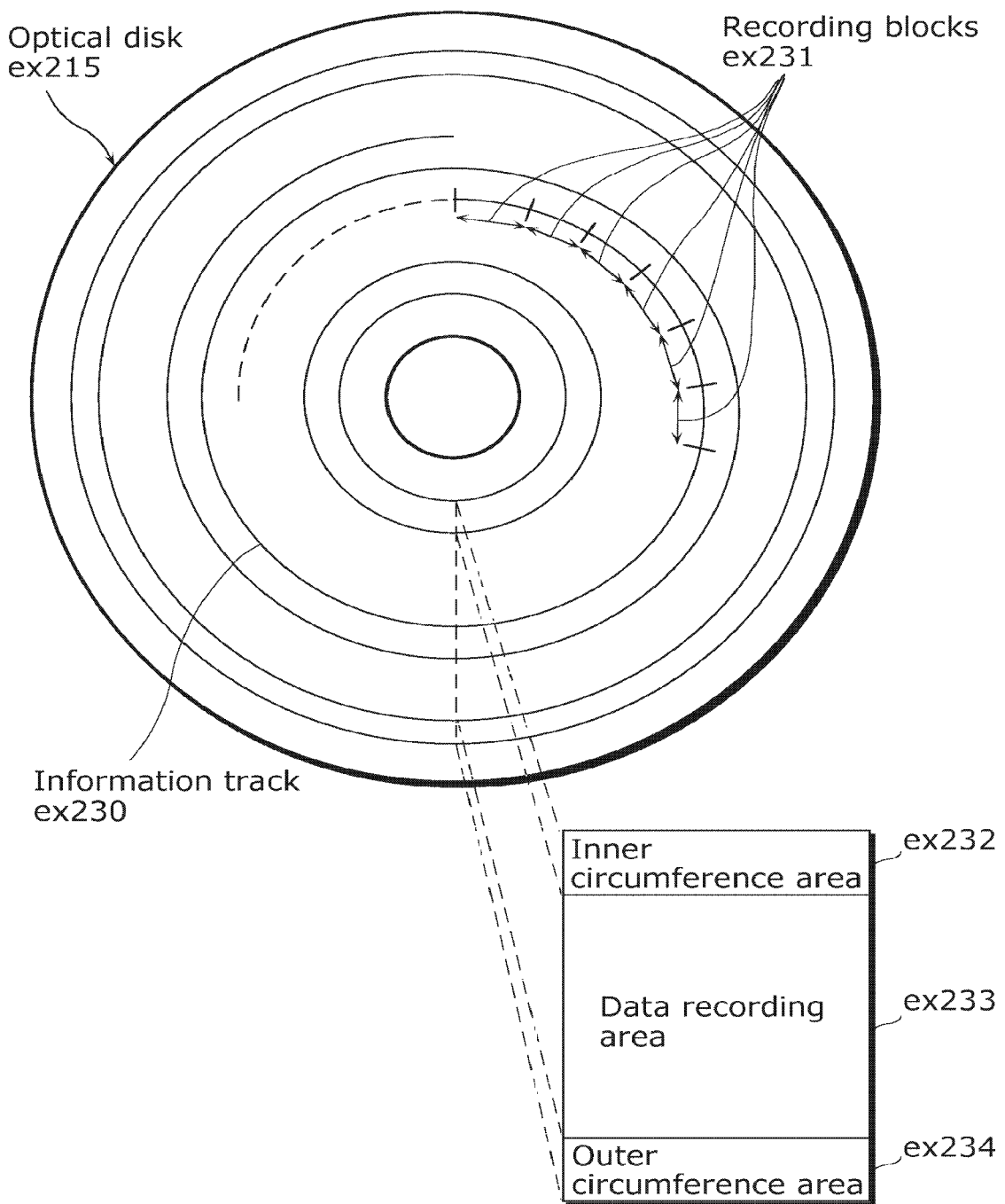
FIG. 24 shows an example of a configuration of a recording medium that is an optical disk.

FIG. 24 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 22. The same will be true for the configuration of the computer ex111, the cellular phone ex114, and others.

Figure 25A:
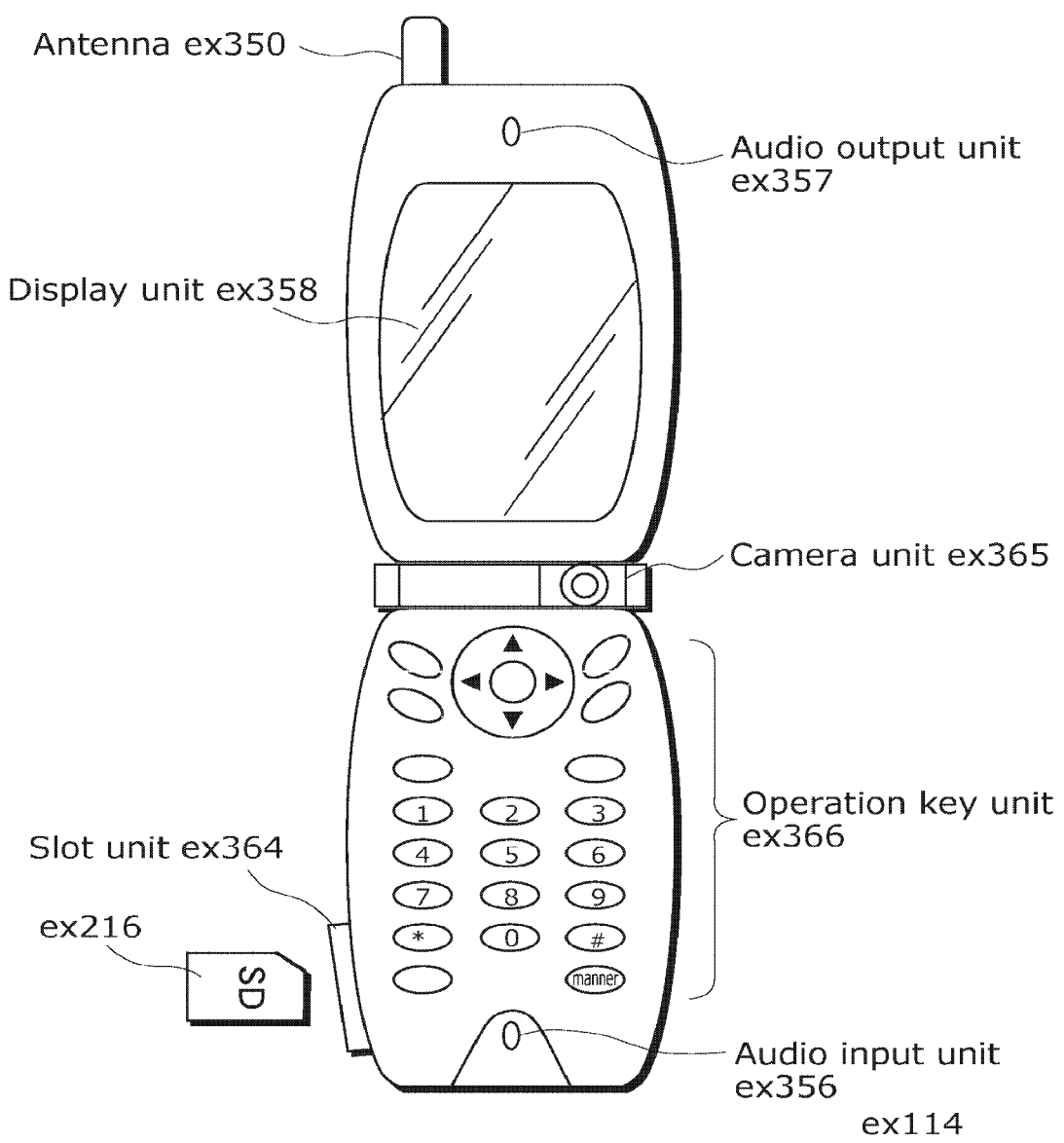
FIG. 25A shows an example of a cellular phone.

FIG. 25A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 25B:
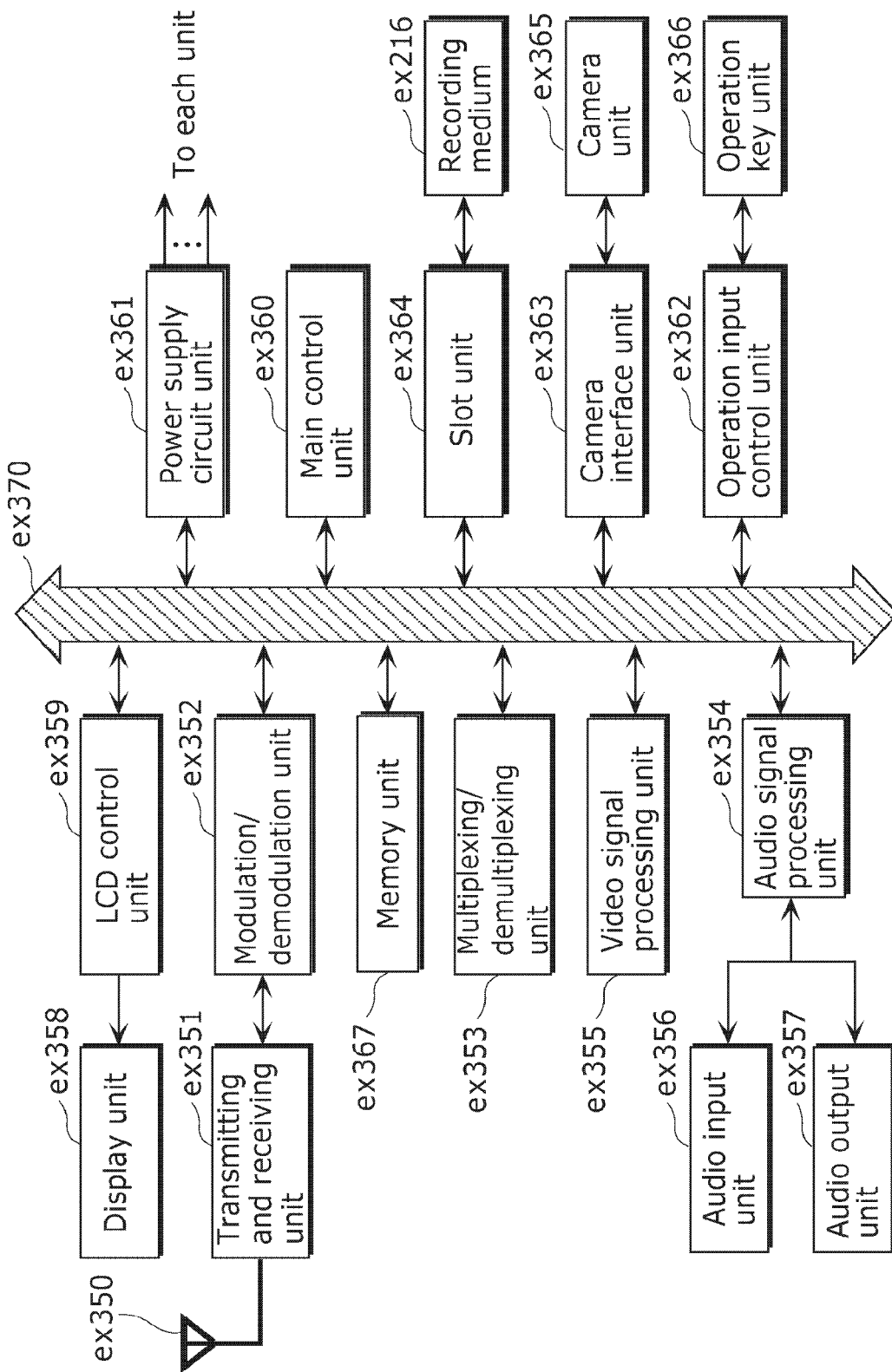
FIG. 25B is a block diagram showing an example of a configuration of a cellular phone.

Next, an example of a configuration of the cellular phone ex114 will be described with reference to FIG. 25B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

Figure 26:
FIG. 26 illustrates a structure of multiplexed data.

FIG. 26 illustrates a structure of the multiplexed data. As illustrated in FIG. 26, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 27:
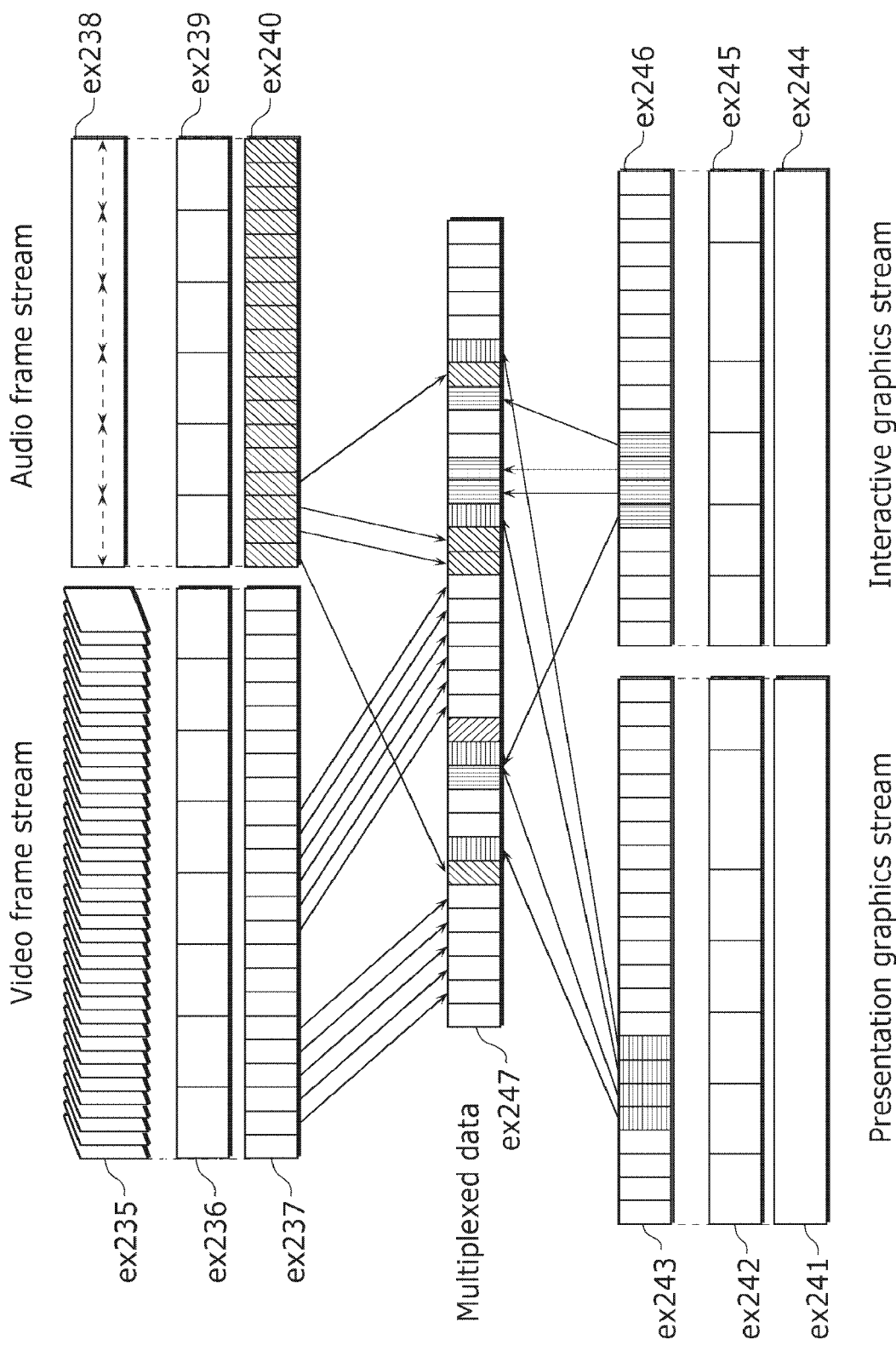
FIG. 27 schematically shows how each stream is multiplexed in multiplexed data.

FIG. 27 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 28:
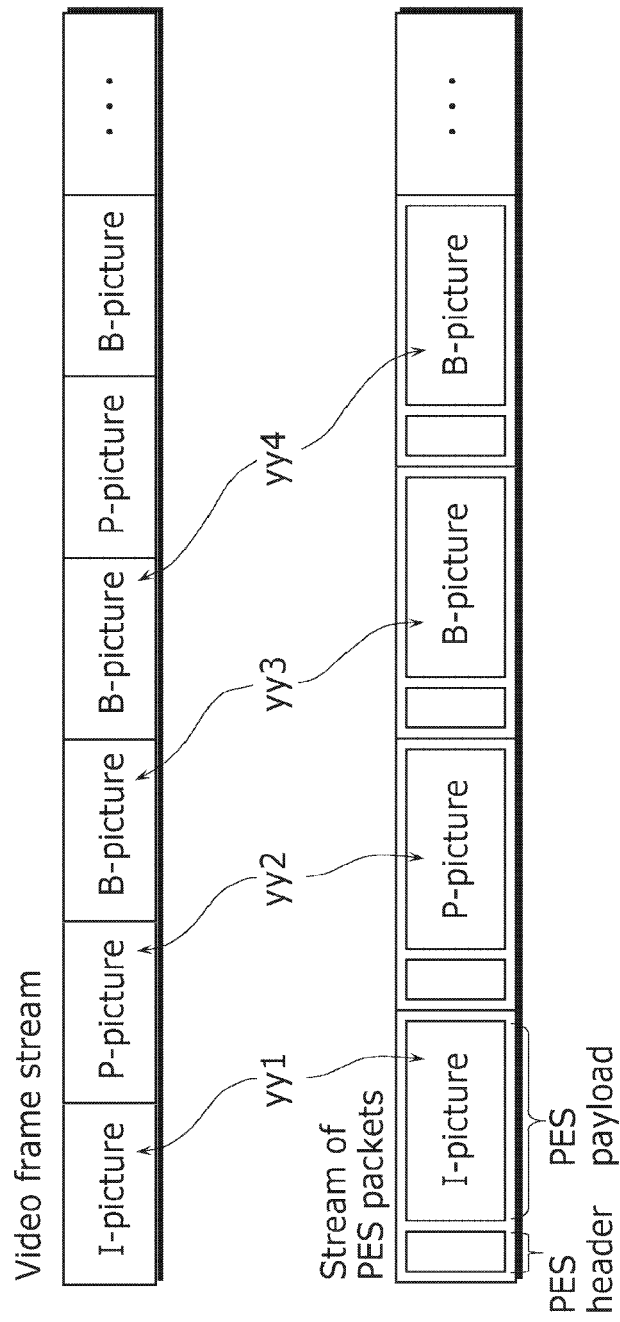
FIG. 28 shows how a video stream is stored in a stream of PES packets in more detail.

FIG. 28 illustrates how a video stream is stored in a stream of PES packets in more detail. The first bar in FIG. 28 shows a video frame stream in a video stream. The second bar shows the stream of PES packets. As indicated by arrows denoted as yy1, yy2, yy3, and yy4 in FIG. 28, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 29 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 29. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 30:
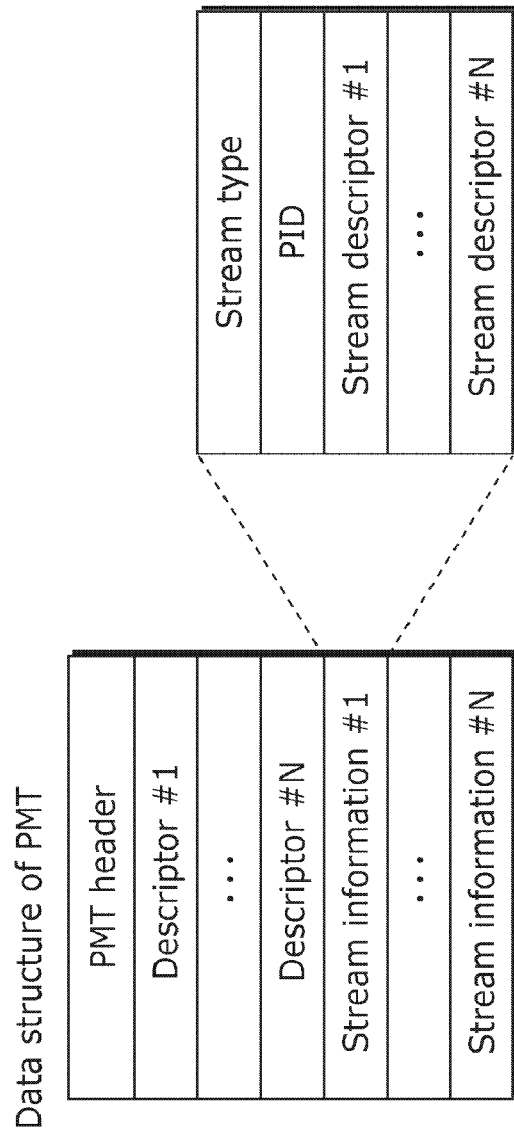
FIG. 30 shows a data structure of a PMT.

FIG. 30 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 31:
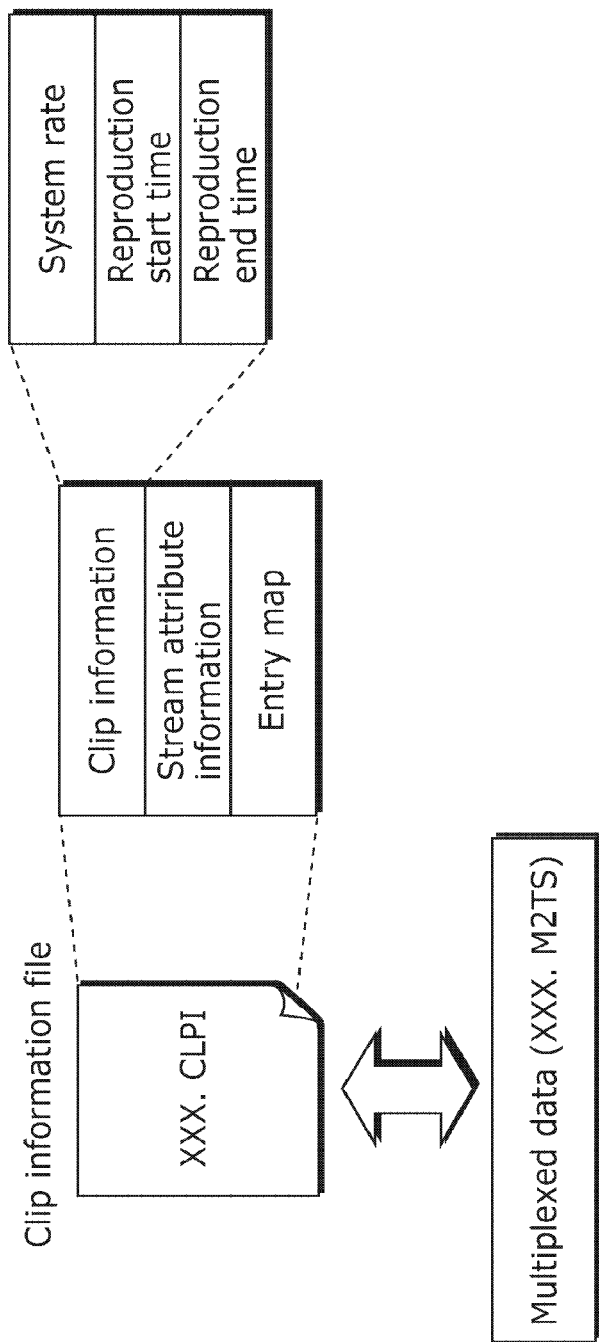
FIG. 31 shows an internal structure of multiplexed data information.

Each of the multiplexed data information files is management information of the multiplexed data as shown in FIG. 31. The multiplexed data information files are in one to one correspondence with the multiplexed data, and each of the files includes multiplexed data information, stream attribute information, and an entry map.

As illustrated in FIG. 31, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 32:
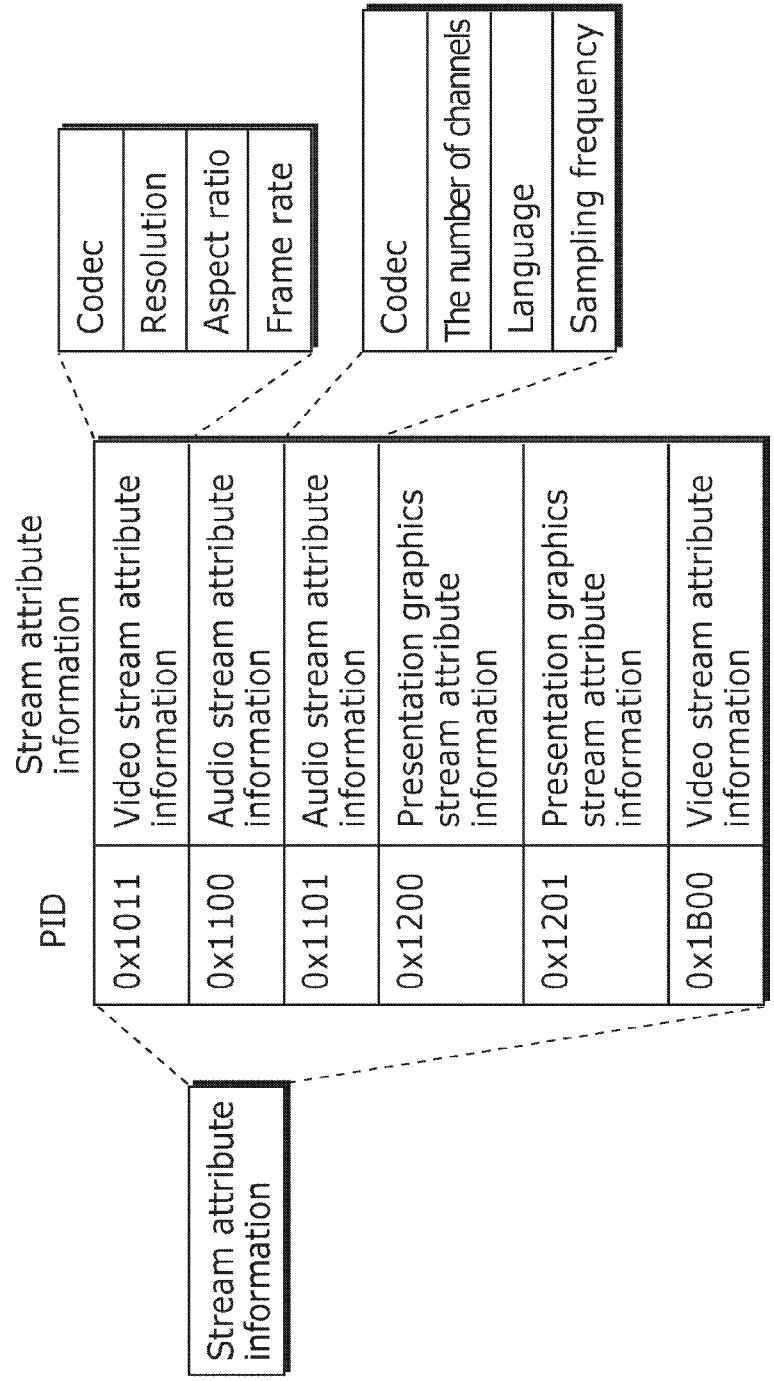
FIG. 32 shows an internal structure of stream attribute information.

As shown in FIG. 32, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 33:
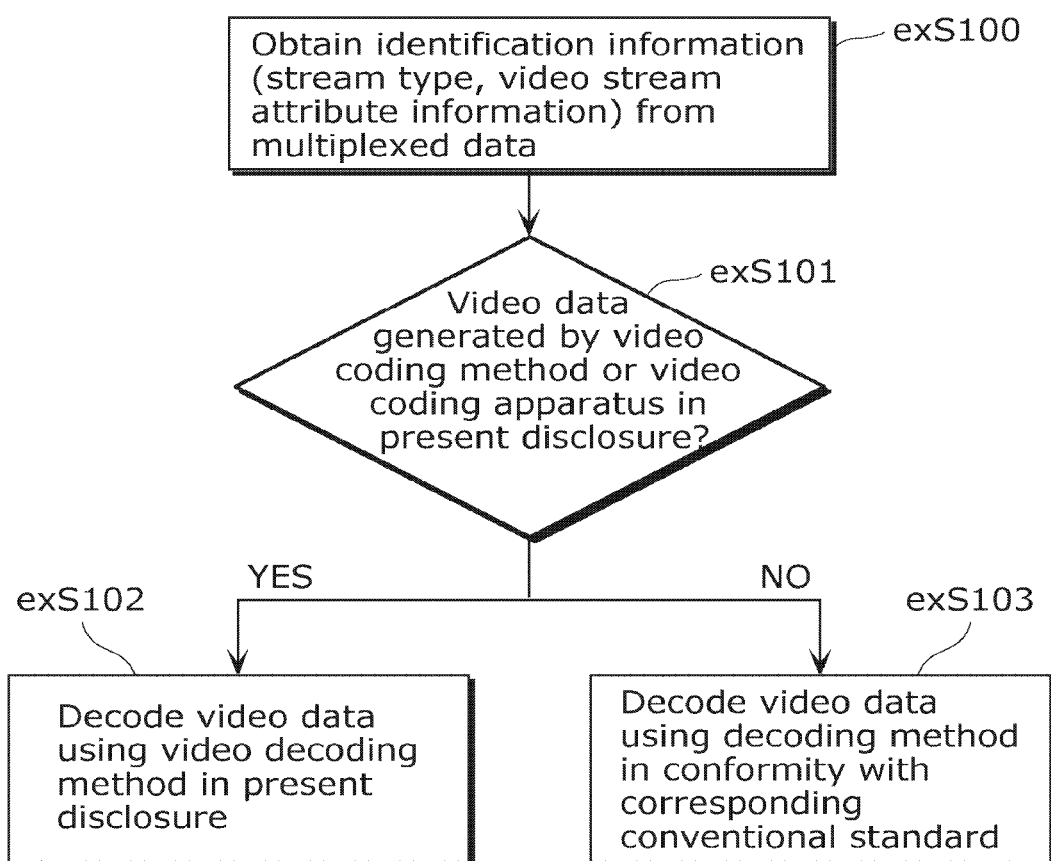
FIG. 33 shows steps for identifying video data.

Furthermore, FIG. 33 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 5

Figure 34:
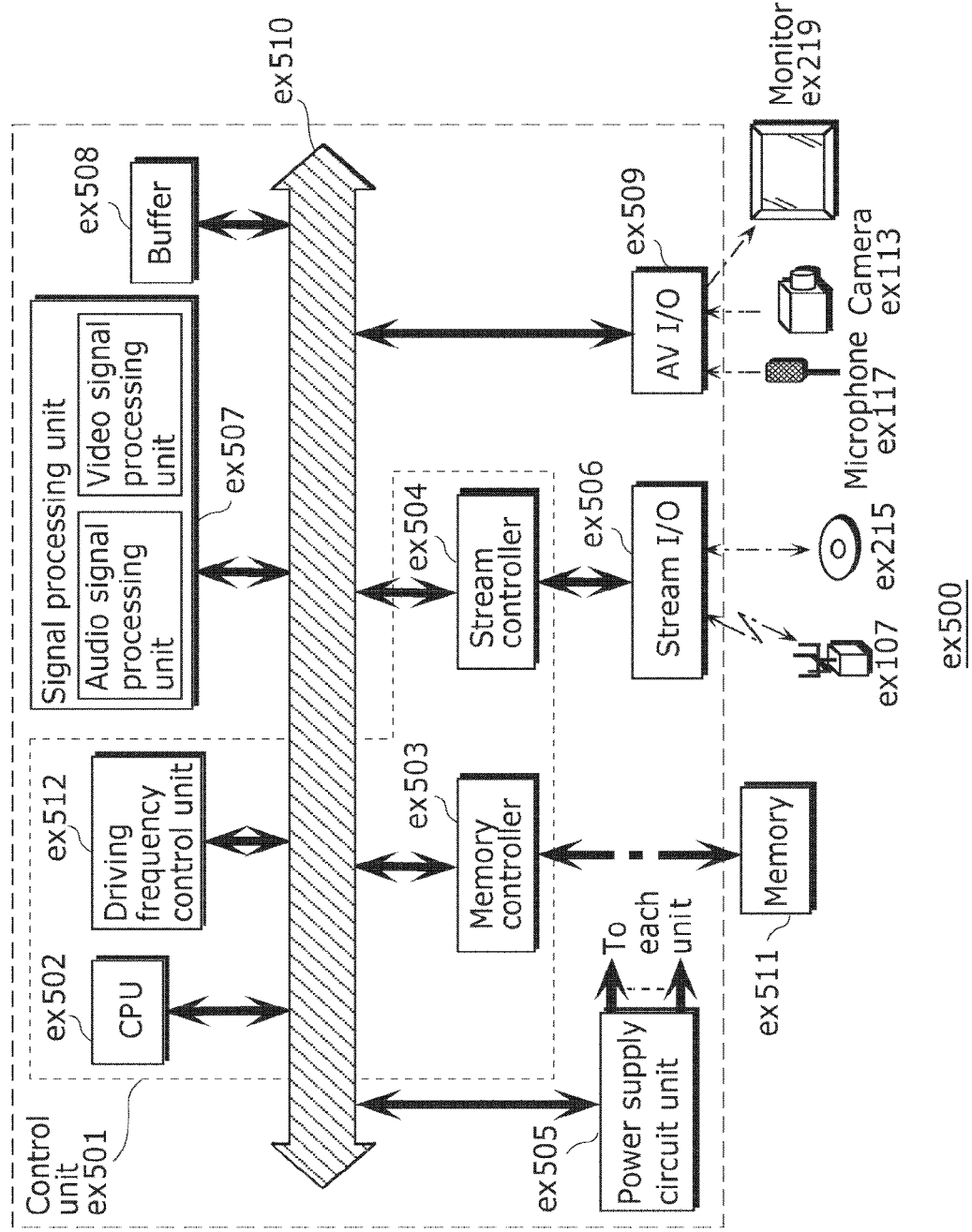
FIG. 34 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 34 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method and/or the moving picture decoding method according to any of the above embodiments, by, loading or reading from a memory or the like one or more programs that are included in software or firmware.

In the future, with advancement in semiconductor technology, a brand-new technology may replace LSI. The functional blocks can be integrated using such a technology. The possibility is that the present disclosure is applied to biotechnology.

Embodiment 6

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 35:
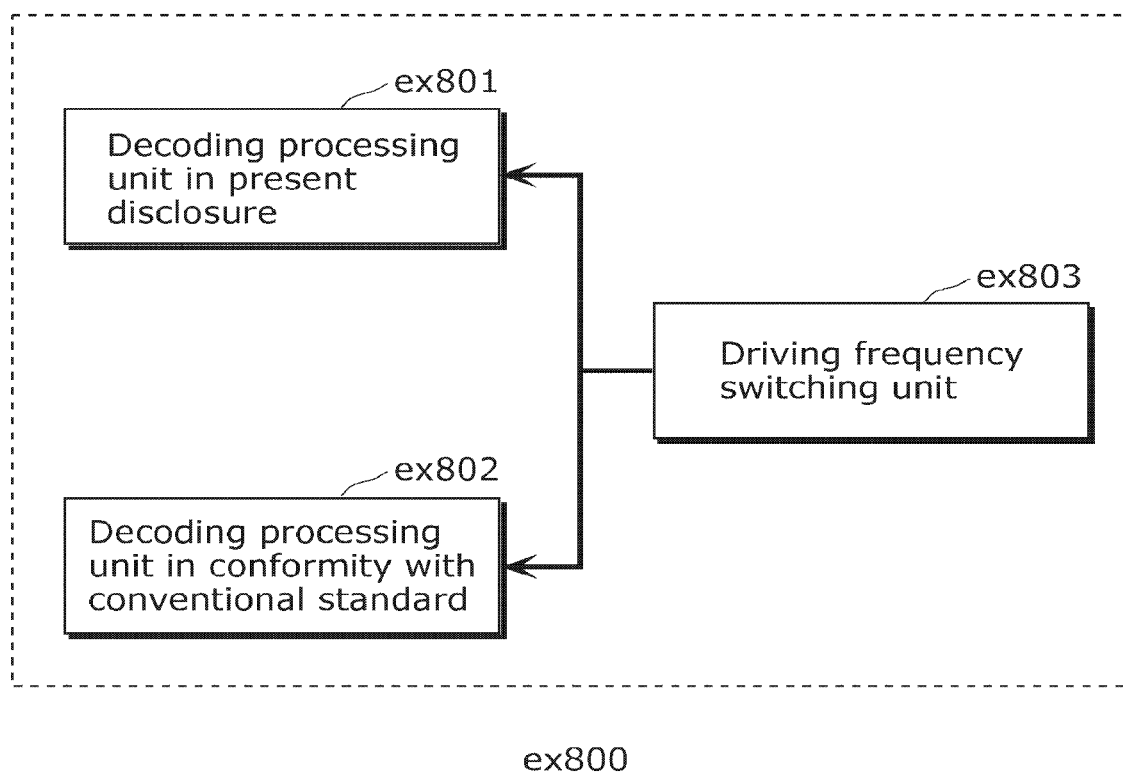
FIG. 35 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 35 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 34. Here, each of the decoding processing unit ex801 that executes the moving picture decoding method described in each of embodiments and the decoding processing unit ex802 that conforms to the conventional standard corresponds to the signal processing unit ex507 in FIG. 34. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 37. The driving frequency can be selected by storing the look-up table in the buffer ex508 and in an internal memory of an LSI, and with reference to the look-up table by the CPU ex502.

Figure 36:
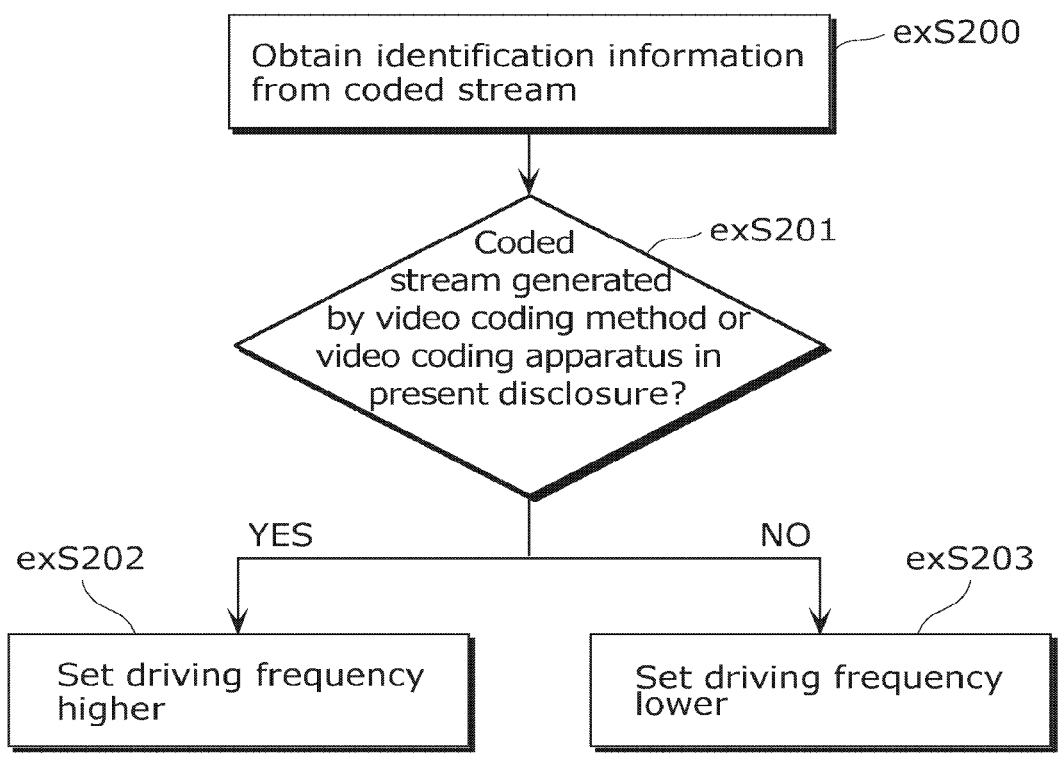
FIG. 36 shows steps for identifying video data and switching between driving frequencies.

FIG. 36 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 38A:
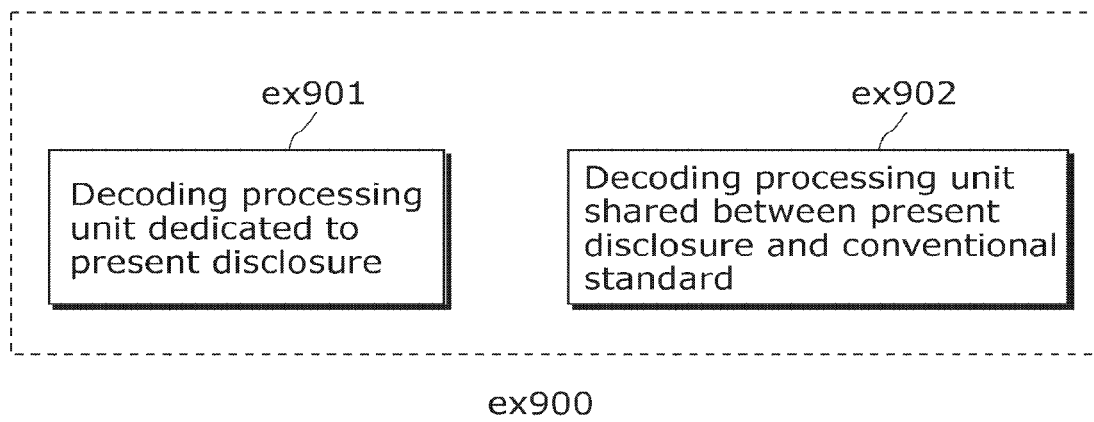
FIG. 38A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 38A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. Since the aspect of the present disclosure is characterized by decoding of motion vectors in particular, for example, the dedicated decoding processing unit ex901 is used for decoding of motion vectors. Otherwise, the decoding processing unit is probably shared for one of the entropy decoding, deblocking filtering, motion compensation, and inverse quantization, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 38B:
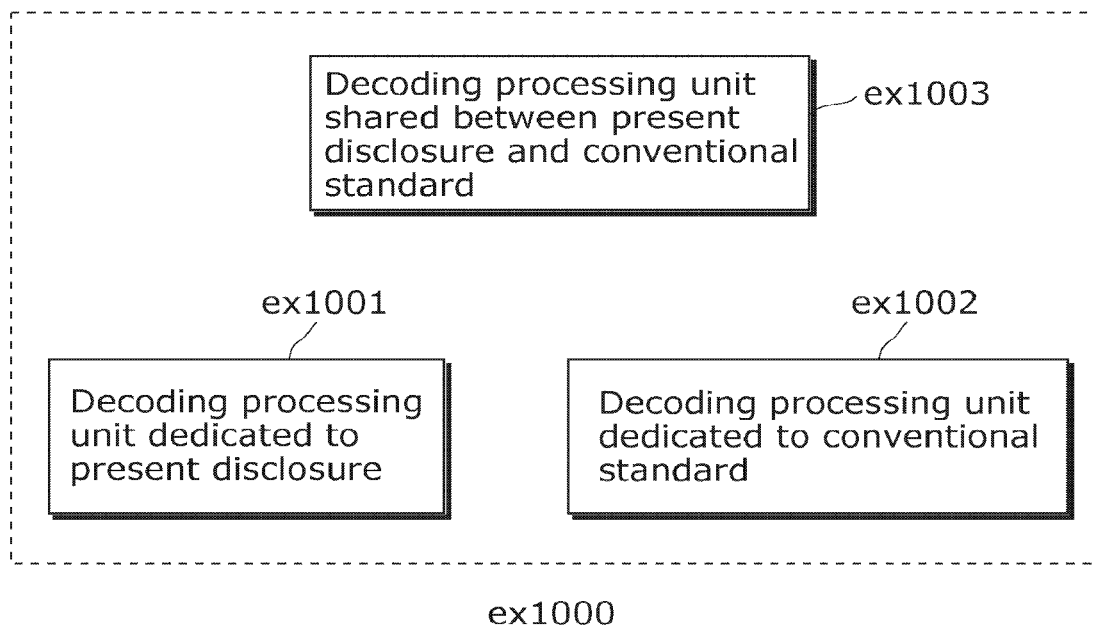
FIG. 38B is a diagram showing another example of a configuration for sharing a module of the signal processing unit.

Furthermore, ex1000 in FIG. 38B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

The moving picture coding method and the moving picture decoding method according to the one or more exemplary embodiments of the present disclosure are used advantageously for moving picture coding apparatuses and moving picture decoding apparatuses.

The invention claimed is:

1. A decoding method comprising:
  obtaining a temporal motion vector enable flag which indicates whether or not using a temporal motion vector predictor is enabled, the temporal motion vector predictor being from a block which is included in a decoded picture different from a decoding target picture and which corresponds to a decoding target block included in the decoding target picture;
  generating a plurality of motion vector predictors;
  decoding a motion vector using one of the plurality of motion vector predictors generated in the generating; and
  decoding the decoding target block using the motion vector decoded in the decoding of the motion vector,
  wherein, in the generating, a motion vector having a motion quantity of 0 is generated when the temporal motion vector enable flag indicates that using the temporal motion vector predictor is not enabled, the motion vector having the motion quantity of 0 being included in the plurality of motion vector predictors.

2. The decoding method according to claim 1, the method further comprising:
  obtaining identification information indicating whether a bit stream is coded by a first standard or coded by a second standard from the bit stream, the first standard being different from the second standard;
  when the identification information indicating the bit stream is coded by the first standard, decoding the bit stream according to the first standard; and
  when the identification information indicating the bit stream is coded by the second standard, the process is executed according to claim 1.

* * * * *